(12) United States Patent
Mao et al.

(10) Patent No.: US 8,463,489 B2
(45) Date of Patent: Jun. 11, 2013

(54) DIAGNOSTIC INFORMATION COLLECTION APPARATUS

(75) Inventors: Siyao Mao, Kariya (JP); Hirokazau Watanabe, Obu (JP); Masayoshi Kondoh, Chiryu (JP)

(73) Assignee: Denso Corporation, Kariya (JP)

( * ) Notice: Subject to any disclaimer, the term of this patent is extended or adjusted under 35 U.S.C. 154(b) by 176 days.

(21) Appl. No.: 13/021,087

(22) Filed: Feb. 4, 2011

(65) Prior Publication Data

US 2011/0190978 A1    Aug. 4, 2011

(30) Foreign Application Priority Data

Feb. 4, 2010 (JP) .................................. 2010-23163

(51) Int. Cl.
  *G06F 19/00* (2006.01)
(52) U.S. Cl.
  USPC ........................................................ 701/34.3
(58) Field of Classification Search
  USPC ........................................................... 701/35
  See application file for complete search history.

(56) References Cited

U.S. PATENT DOCUMENTS

| 5,594,646 | A | 1/1997 | Itoh et al. |
| 2007/0239332 | A1 | 10/2007 | Morikami et al. |
| 2008/0306650 | A1 | 12/2008 | Nakagaki |

FOREIGN PATENT DOCUMENTS

JP    2009-058400    3/2009

*Primary Examiner* — Thomas Tarcza
*Assistant Examiner* — Maceeh Anwari
(74) *Attorney, Agent, or Firm* — Nixon & Vanderhye PC

(57) ABSTRACT

A diagnostic information collection apparatus includes: multiple abnormality detection sections corresponding to respective diagnostic objects in a vehicle to detect an abnormality; and a memory. Each abnormality detection section includes: an abnormality occurrence determination unit; an abnormality confirming unit; a normality conforming unit; a state information generation unit that generates state information indicative of a determination result whether abnormality decision is in progress; and an abnormality-related information processing unit that controls the memory to store identification information about the diagnostic object when the abnormality occurrence determination unit determine the abnormality occurrence at a first time, specifies another abnormality detection section having state information indicative of abnormality decision in progress, and controls the memory to store identification information of the specified another abnormality detection section.

10 Claims, 18 Drawing Sheets

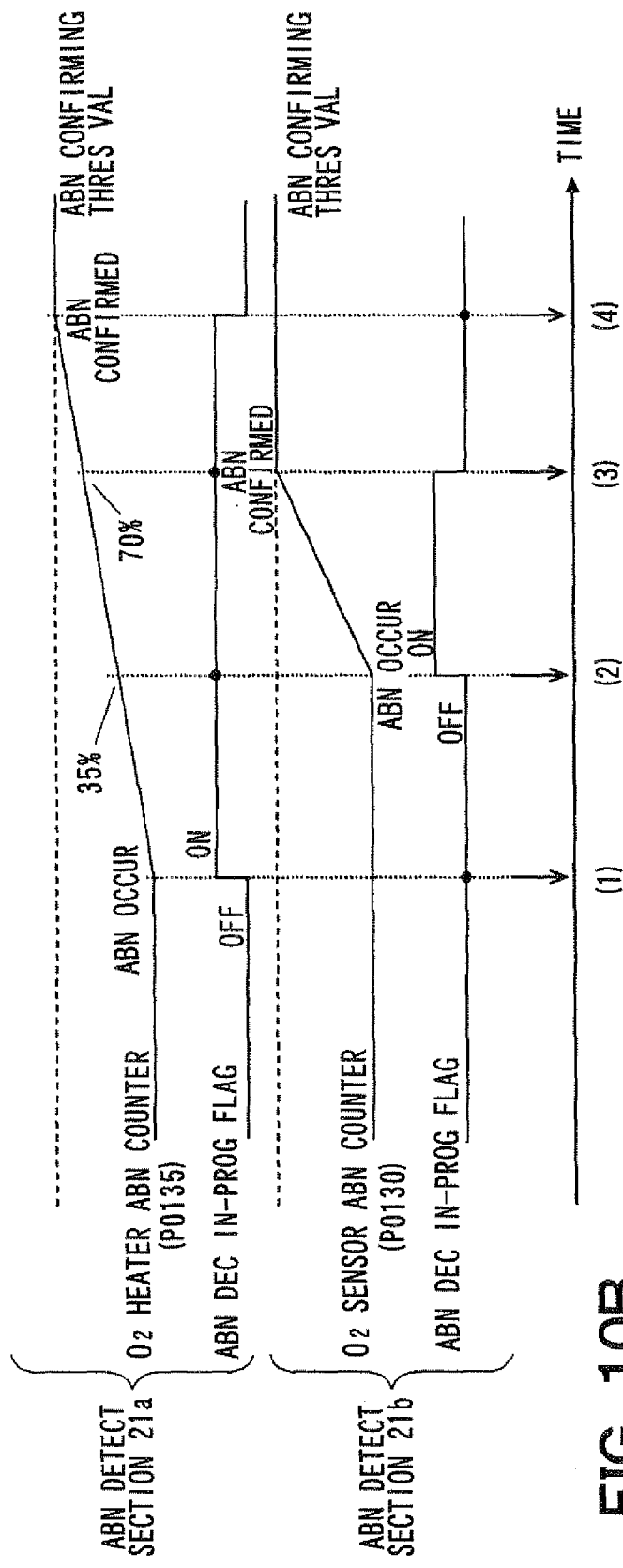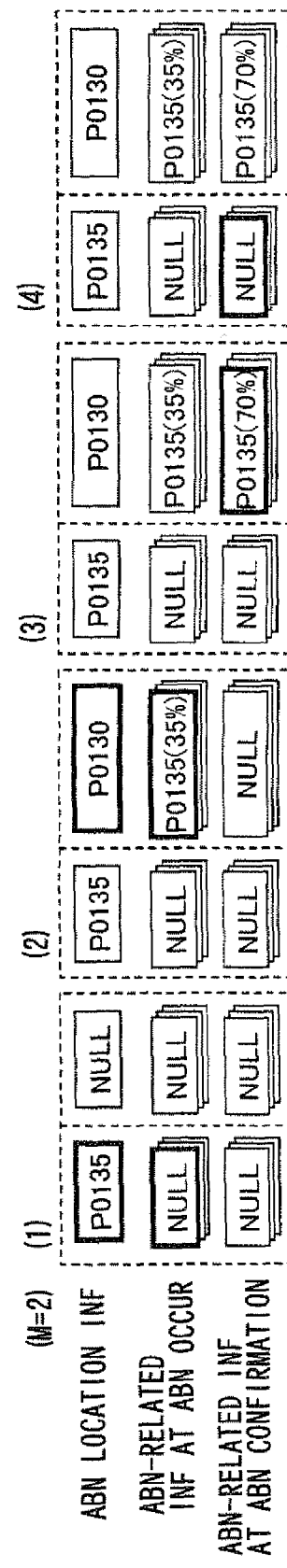
FIG. 10A
FIG. 10B

FIG. 11

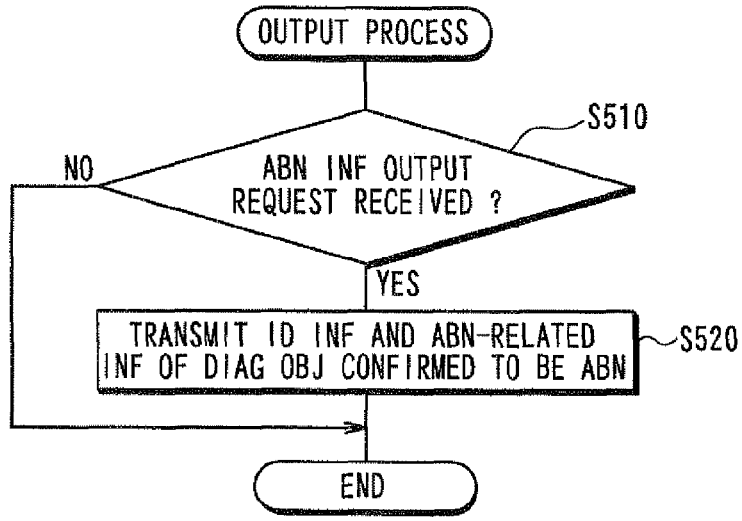

FIG. 12A

| OUTPUT DATA FOR 1ST EXAM | DETECTED ABN | O2 SENSOR ABN |
|---|---|---|
| | REMOTE ABN AT ABN OCCUR | O2 HEATER ABN (PROG LEV 25%) |
| | REMOTE ABN AT ABN CONFIRMATION | O2 HEATER ABN (PROG LEV 0%) |

FIG. 12B

| OUTPUT DATA FOR 2ND EXAM | DETECTED ABN (IN CONFIRMATION ORDER) | O2 HEATER ABN | O2 SENSOR ABN |
|---|---|---|---|
| | REMOTE ABN AT ABN OCCUR | NONE | O2 HEATER ABN (PROG LEV 40%) |
| | REMOTE ABN AT ABN CONFIRMATION | O2 SENSOR ABN (PROG LEV 80%) | NONE |

FIG. 12C

| OUTPUT DATA FOR 3RD EXAM | DETECTED ABN (IN CONFIRMATION ORDER) | O2 SENSOR ABN | O2 HEATER ABN |
|---|---|---|---|
| | REMOTE ABN AT ABN OCCUR | O2 HEATER ABN (PROG LEV 35%) | NONE |
| | REMOTE ABN AT ABN CONFIRMATION | O2 HEATER ABN (PROG LEV 70%) | NONE |

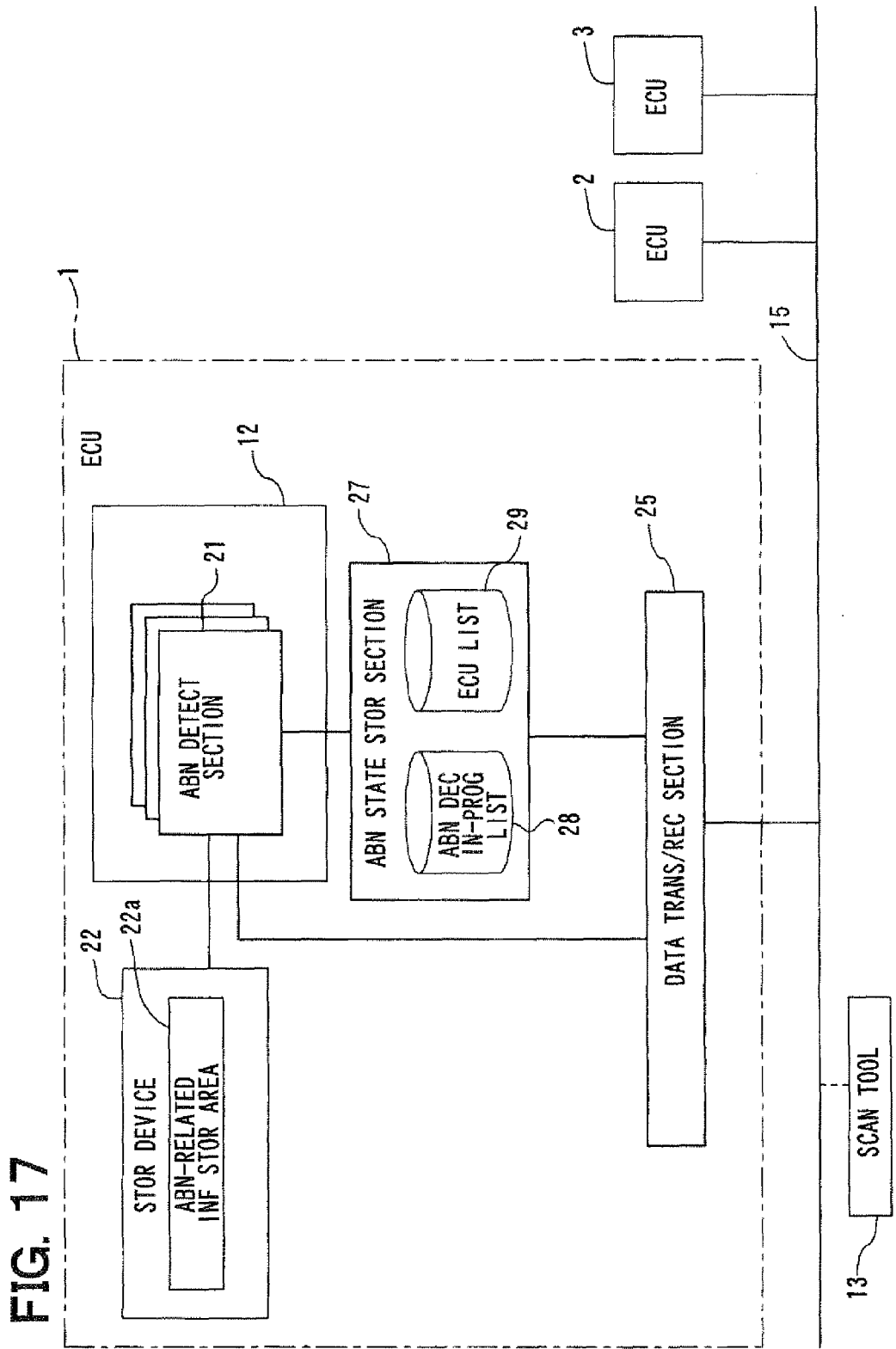

DIAGNOSTIC INFORMATION COLLECTION APPARATUS

CROSS REFERENCE TO RELATED APPLICATION

This application is based on Japanese Patent Application No. 2010-23163 filed on Feb. 4, 2010, the disclosure of which is incorporated herein by reference.

FIELD OF THE INVENTION

The present invention relates to a diagnostic information collection apparatus for diagnosing a vehicle.

BACKGROUND OF THE INVENTION

Conventionally, a vehicle-mounted electronic control unit (ECU) performs self-diagnosis. When detecting a failure (abnormality), the ECU allows a storage unit to store abnormal information equivalent to Diagnostic Trouble Code (DTC) indicating the failure content and the date and time (time information) of the failure occurrence (e.g., see Patent Document 1).

For example, this type of ECU periodically determines whether an abnormality occurs on a diagnostic object. The ECU counts occurrences of the abnormality detected by the determination process. When the count reaches a specified abnormality confirming threshold value, the ECU first determines that the diagnostic object is abnormal. That is, the ECU detects the abnormality at that point and then stores abnormal information. This aims to prevent incorrect detection of an abnormality.

The abnormality of one diagnostic object may cause the abnormality of another diagnostic object. For example, an oxygen sensor detects the oxygen concentration (or an air-fuel ratio) in the exhaust gas from an engine. While a heater heats the oxygen sensor at an appropriate temperature, the ECU controls the injection quantity supplied to the engine based on an output signal from the oxygen sensor. When the heater causes an abnormality, the oxygen sensor outputs a signal indicating an abnormal voltage value. An abnormality detection process for the heater as a diagnostic object detects the abnormality of the heater. Further, an abnormality detection process for the oxygen sensor as a diagnostic object detects the abnormality of the oxygen sensor.

The technology according to Patent Document 1 stores the abnormal information and the time information about the time to determine the abnormality when a given diagnostic object is determined to be abnormal. When multiple diagnostic objects are detected to be abnormal, the time information stored with the abnormal information can notify the history of the diagnostic objects that are determined to be abnormal.

Generally, however, a time period between the abnormality occurrence and the determination of the abnormality depends on diagnostic objects. When an abnormality of diagnostic object A causes an abnormality of diagnostic object B, diagnostic object B is determined to be abnormal prior to diagnostic object A whose abnormality occurred earlier than diagnostic object B. That is, abnormalities may be detected in reverse order.

The technology according to Patent Document 1 just stores the time information about the abnormality determination and cannot notify such a reversal. When multiple abnormalities are detected, that technology cannot easily find the cause or the first abnormality.

To solve this problem, the technology described in Patent Document 2 stores not only the time information about the abnormality determination but also time information (about the time to start abnormality determination) indicating the time when a state determined to be normal changes to a state determined to be abnormal. When multiple abnormalities are detected, the technology compares the time information about the time to start abnormality determination with the other time information. This makes clear the order of abnormality occurrences and facilitates the estimation of an abnormality cause.

Patent Document 1: JP-H7-181112 A corresponding to U.S. Pat. No. 5,594,646
Patent Document 2: JP-2008-304367 A corresponding to US 2008/0306650

However, the technology according to Patent Document 2 still leaves the following problem unsolved.

The following shows an example where abnormality a of diagnostic object A causes abnormality b of diagnostic object B.

To analyze the relation between two abnormalities a and b, it is necessary to compare pieces of the time information about the time to start determining the two abnormalities a and b with each other. However, the abnormal information or the time information about abnormalities a and b contains no information about the relation between the two. Even though the time information about one of abnormalities a and b is read, the relation about the other abnormality is unknown. The cause of the abnormality cannot be estimated. There may be some reasons why only the time information about one of abnormalities a and b is read. For example, an external tool clears one of the pieces of information. One of the pieces of information is overwritten by information about the other abnormality. One of the pieces of information exists in the other ECU and this ECU is replaced.

According to Patent Document 2, the time information about the most recent time to start the abnormality determination overwrites the time information about an earlier time to start the abnormality determination. It takes time while diagnostic object A is assumed to be abnormal and is finally determined to be abnormal. During this period, the state of diagnostic object A varies. Diagnostic object A is first assumed to be abnormal, then returns to a normal state, and is again assumed to be abnormal. Such state variation is repeated once or more and denotes that the abnormality is indefinite. This method repeatedly updates the time information about the time to start the abnormality determination on diagnostic object A. Let us suppose that abnormality a of diagnostic object A causes abnormality b of diagnostic object B. Despite this, the time information about the time to start the abnormality determination on diagnostic object A is finally stored and may be recorded later than the time information about the time to start the abnormality determination on diagnostic object B. The time information about the time to start abnormality determination does not correctly indicate the occurrence order of abnormalities a and b.

SUMMARY OF THE INVENTION

In view of the above-described problem, it is an object of the present disclosure to provide a diagnostic information collection apparatus for diagnosing a vehicle. The diagnostic information collection apparatus correctly and easily identify the occurrence order of multiple abnormalities in a vehicle and improve the ease of diagnosis.

According to an aspect of the present disclosure, a diagnostic information collection apparatus includes: a plurality of abnormality detection sections, each of which corresponds to a respective diagnostic object in a vehicle in order to detect an abnormality on the diagnostic object; and a memory. Each abnormality detection section includes: an abnormality occurrence determination unit that determines whether an abnormality occurs on a corresponding diagnostic object such that the abnormality occurrence determination unit checks whether the corresponding diagnostic object satisfies an abnormality determination condition; an abnormality confirming unit that confirms the corresponding diagnostic object to be abnormal when the number of abnormality determinations is equal to or larger than an abnormality confirmation threshold, the number of abnormality determinations being defined by frequency of determinations when the abnormality occurrence determination unit determines that the abnormality occurs on the corresponding diagnostic object; a normality conforming unit that determines whether the corresponding diagnostic object satisfies a normality determination condition and confirms the corresponding diagnostic object to be normal when the number of normality determinations is equal to or larger than an normality confirmation threshold, the number of normality determinations being defined by frequency of determinations when the normality confirming unit determines that the corresponding diagnostic object satisfies the normality determination condition; a state information generation unit that determines whether abnormality decision is in progress and generates state information indicative of a determination result whether abnormality decision is in progress, wherein the abnormality decision in progress denotes a state in which the abnormality occurrence determination unit determines the abnormality occurrence but both of the abnormality confirming unit and the normality confirming unit do not confirm whether the corresponding diagnostic object is normal or abnormal; and an abnormality-related information processing unit that controls the memory to store identification information about the corresponding diagnostic object as abnormality location information when the abnormality occurrence determination unit determine the abnormality occurrence on the corresponding diagnostic object at a first time, specifies another abnormality detection section having state information indicative of abnormality decision in progress, and controls the memory to store identification information about a respective diagnostic object of the specified another abnormality detection section as abnormality-related information in association with the abnormality location information.

Such diagnostic information collection apparatus provides the following effects (a) through (c).

(a) The memory stores the abnormality-related information in association with the abnormality location information. Just reference to the abnormality-related information can identify another diagnostic object that is already determined to be abnormal at the first abnormality determination for the diagnostic object indicated by the abnormality location information. It is possible to assume that the other diagnostic object might have caused the abnormality of the diagnostic object indicated by the abnormality location information.

(b) The order of abnormality occurrences can be made clear without time information. This is because an abnormality on the diagnostic object indicated by the abnormality-related information stored in association with the abnormality location information is assumed to occur before an abnormality on a diagnostic object indicated by the abnormality location information.

(c) The abnormality-related information stored at the first abnormality determination is not updated. Let us consider a case where abnormality a occurs on diagnostic object A, then abnormality b occurs on diagnostic object B, and abnormality a becomes indefinite. Even in such a case, the abnormality-related information is stored in association with the abnormality location information indicative of diagnostic object B. It is made clear that abnormality a occurs on diagnostic object A before abnormality b occurs on diagnostic object B. It is possible to assume that abnormality a causes abnormality b.

The above-mentioned effects make it possible to correctly and easily understand the order of multiple abnormalities occurred on a vehicle and improve the ease of the diagnosis.

BRIEF DESCRIPTION OF THE DRAWINGS

The above and other objects, features and advantages of the present invention will become more apparent from the following detailed description made with reference to the accompanying drawings. In the drawings:

FIGS. 10A and 10B are diagrams illustrating a third example of actions;

FIG. 11 is a flowchart illustrating an output process;

FIGS. 12A to 12C are diagrams illustrating the contents displayed on a scan tool display apparatus;

FIG. 17 is a diagram illustrating an onboard network according to a fifth embodiment;

DETAILED DESCRIPTION OF THE PREFERRED EMBODIMENTS (First Embodiment)

Embodiments of the present invention will be described.

Figure 1:
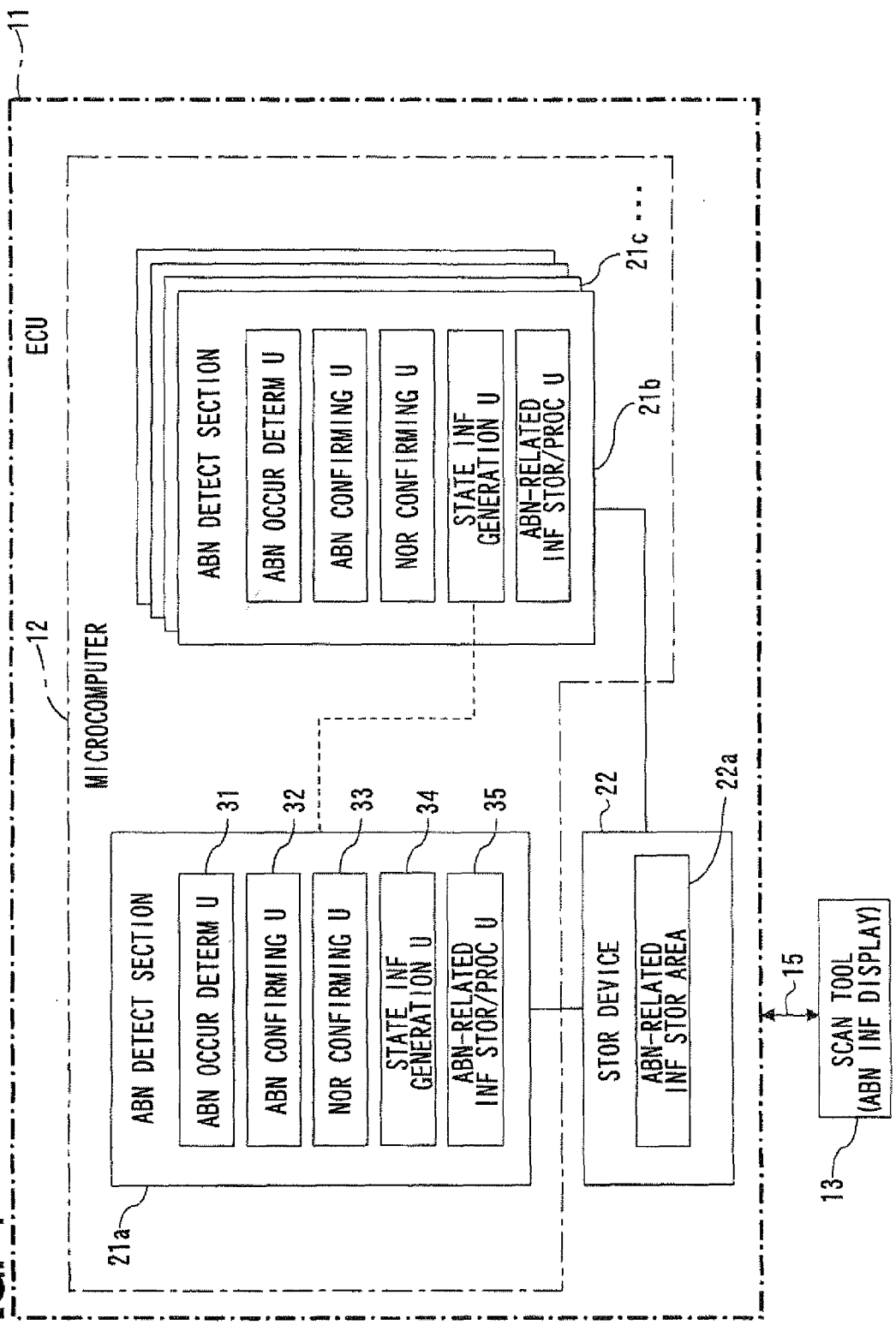
FIG. 1 is a diagram illustrating an ECU (electronic control unit) according to a first embodiment.

FIG. 1 is a configuration diagram illustrating an ECU (electronic control unit) 11 according to the first embodiment using the diagnostic information collection apparatus of the invention.

The ECU 11 is mounted on a vehicle and controls its engine, for example. The ECU 11 is provided with a widely known microcomputer 12 and a storage device 22. The microcomputer 12 includes a CPU, ROM, and RAM (not shown) and functions as a processing unit for performing various processes such as controlling an object under control and detecting an abnormality.

The storage device 22 uses nonvolatile memory such as flash ROM or EEPROM capable of rewriting data. The storage device 22 may also use so-called backup RAM or standby RAM that is always powered from an onboard battery. The storage device 22 may be provided outside or inside the microcomputer 12.

The ECU 11 includes abnormality detection sections 21a, 21b, 21c, and so on for detecting abnormalities of multiple diagnostic objects independently of each other. The abnormality detection section 21 represents the abnormality detection sections 21a, 21b, 21c, and so on when these need not be distinguished from each other.

The abnormality detection section 21 includes an abnormality occurrence determination unit 31, an abnormality confirming unit 32, a normality confirming unit 33, and a state information generation unit 34. The abnormality occurrence determination unit 31 determines whether an abnormality occurs on the diagnostic object based on a criteria whether the diagnostic object satisfies an abnormality determination condition. An abnormality determination count indicates the number of abnormality occurrences detected by the abnormality occurrence determination unit 31. When the abnormality determination condition reaches an abnormality confirming threshold value, the abnormality confirming unit 32 confirms that the diagnostic object is abnormal. The normality confirming unit 33 determines whether the diagnostic object satisfies a normality determination condition. When a count of cases to satisfy the normality determination condition reaches a normality confirming threshold value, the normality confirming unit 33 confirms that the diagnostic object is normal. The state information generation unit 34 determines whether the abnormality decision is in progress, and then generates an abnormality decision in progress flag (equivalent to state information) indicating the determination result. The abnormality decision in progress signifies a state in which the abnormality occurrence determination unit 31 determines an occurrence of abnormality but neither the abnormality confirming unit 32 nor the normality confirming unit 33 confirms an abnormality. The abnormality detection section 21 also performs an abnormality-related information storage processing unit 35 equivalent to processes in FIGS. 5 and 6 to be described later.

The abnormality detection section 21 is actually a functional block implemented by the CPU included in the microcomputer 12 through execution of a program stored in the ROM.

A scan tool 13 is a diagnostic device used by a vehicle maintenance worker to diagnose vehicles. The ECU 11 can be connected to the scan tool 13 via a communication line 15 inside the vehicle. The scan tool 13 can be also used as an abnormal information display device that collects information about an abnormality from the ECU 11 and displays the information.

Figure 2:
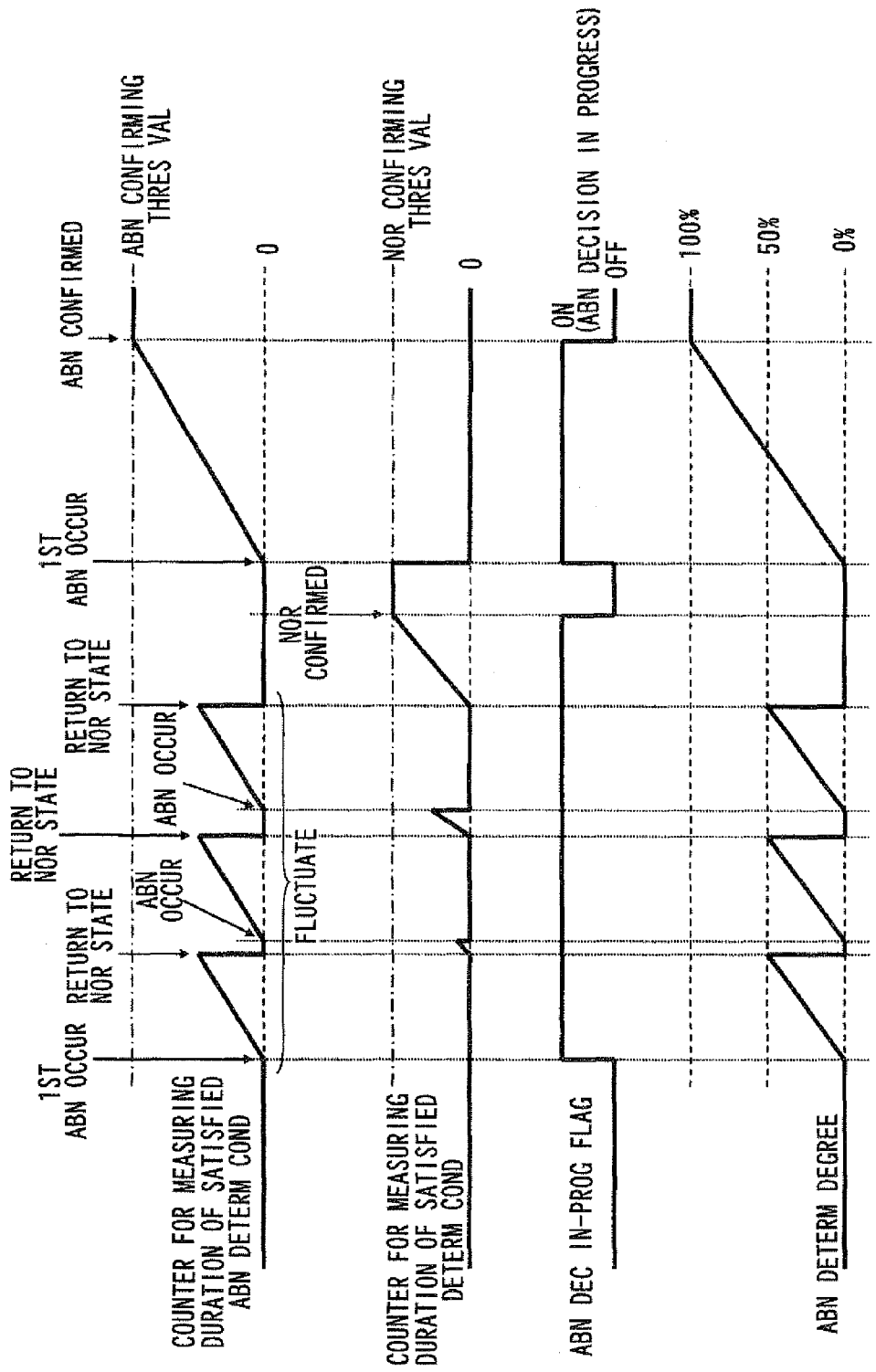
FIG. 2 is a diagram illustrating technical terms used in the specification.

With reference to FIG. 2, the following describes technical terms used throughout this specification.

Abnormality occurrence: A time point at which the abnormality determination condition about a diagnostic object is satisfied while the condition was not satisfied before that time point. The abnormality occurrence provides a start point to measure a duration of the satisfied abnormality determination condition, namely, a duration in which the abnormality determination condition remains satisfied.

Abnormality confirmation: A time point at which the duration of the satisfied abnormality determination condition reaches a specified abnormality confirming threshold value for determining that a diagnostic object is definitely assumed to be abnormal.

Normality confirmation: A time point at which the duration of the satisfied normality determination condition reaches a specified normality confirming threshold value for determining that a diagnostic object is definitely assumed to be normal. For the duration, the normality determination condition about a diagnostic object is satisfied and remains satisfied.

Normal restoration: A state in which an abnormality occurs and then the normality determination condition is satisfied without change to the abnormality confirmation.

Abnormality determination in progress: A period from the abnormality occurrence to the abnormality confirmation or the normality confirmation. For this period, the abnormality determination condition is satisfied but neither the abnormality confirmation nor the normality confirmation is reached.

Abnormality determination in-progress flag: A flag indicating whether the abnormality decision is in progress, as mentioned above. The abnormality decision in progress flag, when turned on, indicates that the abnormality decision is in progress. The abnormality decision in progress flag, when turned off, indicates that the abnormality decision is not in progress.

First abnormality occurrence: An event to turn on the abnormality decision in progress flag that was turned off.

Abnormality determination degree: A ratio of the duration of the satisfied abnormality determination condition to the abnormality confirming threshold value. The ratio is expressed in percentage.

Abnormality indefiniteness (or just indefiniteness): A state in which the first abnormality occurs, then the abnormality determination condition is satisfied intermittently, and the abnormality confirmation is not reached. In this state, the abnormality is indefinite as mentioned above.

The embodiment periodically determines whether the abnormality determination condition is satisfied. An abnormality counter is incremented (see the first chart from the top of FIG. 2) each time the abnormality determination condition is determined to be satisfied. The abnormality counter measures the duration of the satisfied abnormality determination condition. Accordingly, the "abnormality confirmation" may be represented as a time point at which a successive count of determining the abnormality determination condition to be satisfied reaches the abnormality confirming threshold value. The "abnormality decision degree" may be represented as a ratio of an abnormality counter value to the abnormality confirming threshold value. The abnormality decision degree may be also represented as a ratio of the successive count of determining the abnormality determination condition to be satisfied to the abnormality confirming threshold value.

Likewise, the embodiment periodically determines whether the normality determination condition is satisfied. A normality counter is incremented (see the second chart from the top of FIG. 2) each time the normality determination condition is determined to be satisfied. The normality counter measures the duration of the satisfied normality determination condition. Accordingly, the "normality confirmation" may be represented as a time point at which a successive count of determining the normality determination condition to be satisfied reaches the normality confirming threshold value.

Figure 3:
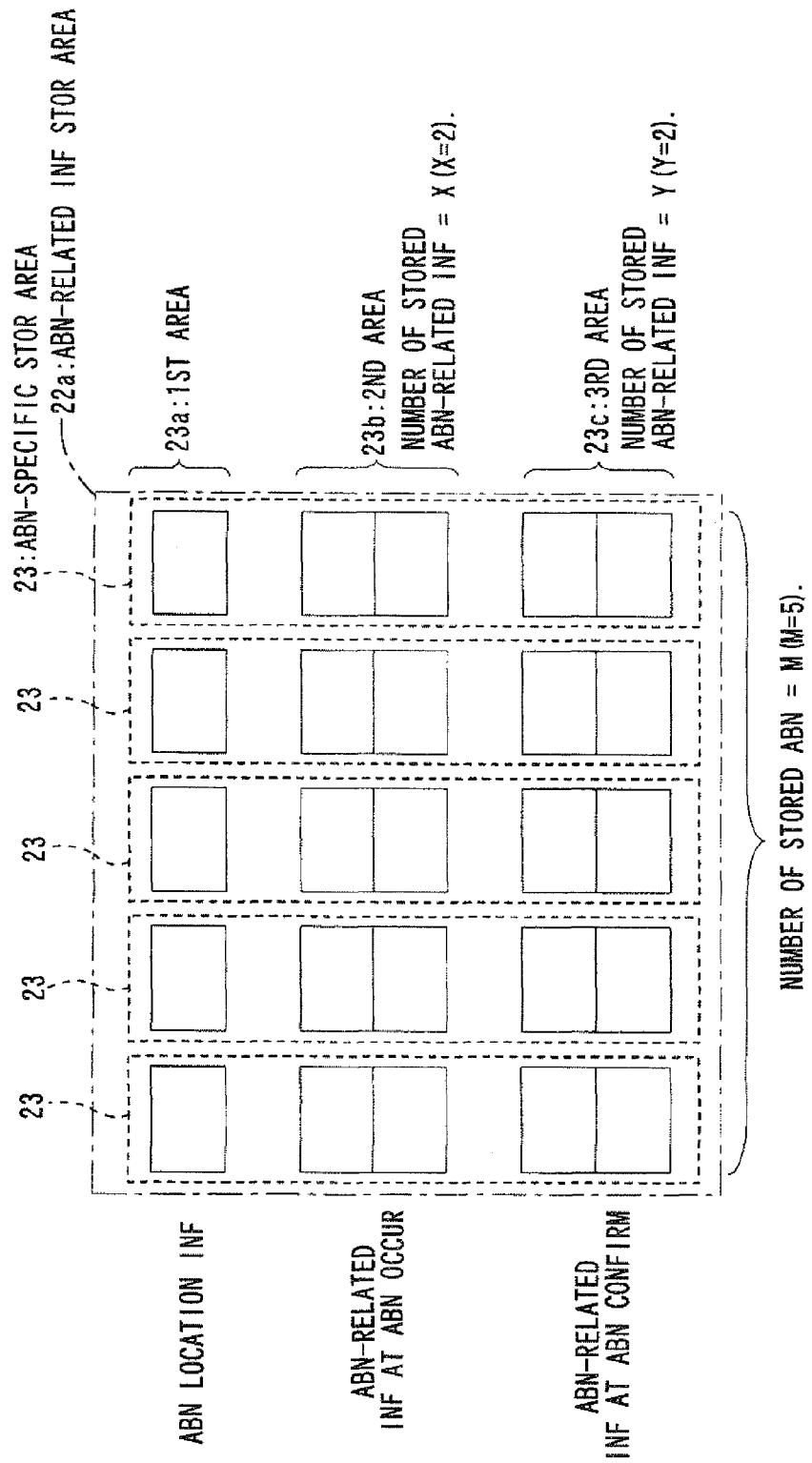
FIG. 3 is a diagram illustrating an abnormality-related information storage area of a storage device.

With reference to FIG. 3, the following describes storage areas of the storage device 22.

As shown in FIG. 3, the storage device 22 contains an abnormality-related information storage area 22a. The abnormality-related information storage area 22a is divided into M abnormality-specific storage areas 23. Each abnormality-specific storage area 23 includes a first area 23a, a second area 23b, and a third area 23c. The first area 23a can store one piece of abnormality location information. The second area 23b can store X pieces of abnormality-related information when an abnormality occurs. The third area 23c can store Y pieces of abnormality-related information at the abnormality confirmation. In the description, M, X, and Y each represent one or more integers. Information stored in the abnormality-related information storage area 22a will be described later.

Though not shown in the drawings, the storage device 22 also includes an abnormality diagnosis state storage area and an abnormality confirmation information storage area. The abnormality diagnosis state storage area stores an abnormality decision in progress flag so that the flag can identify which abnormality detection section 21 corresponds to the flag. The abnormality confirmation information storage area stores information about a diagnostic object that is confirmed to be abnormal.

A process performed by each abnormality detection section 21 will be described. The process performed by each abnormality detection section 21 is actually equivalent to a process performed by the CPU of the microcomputer 12 on each diagnostic object.

Figure 4:
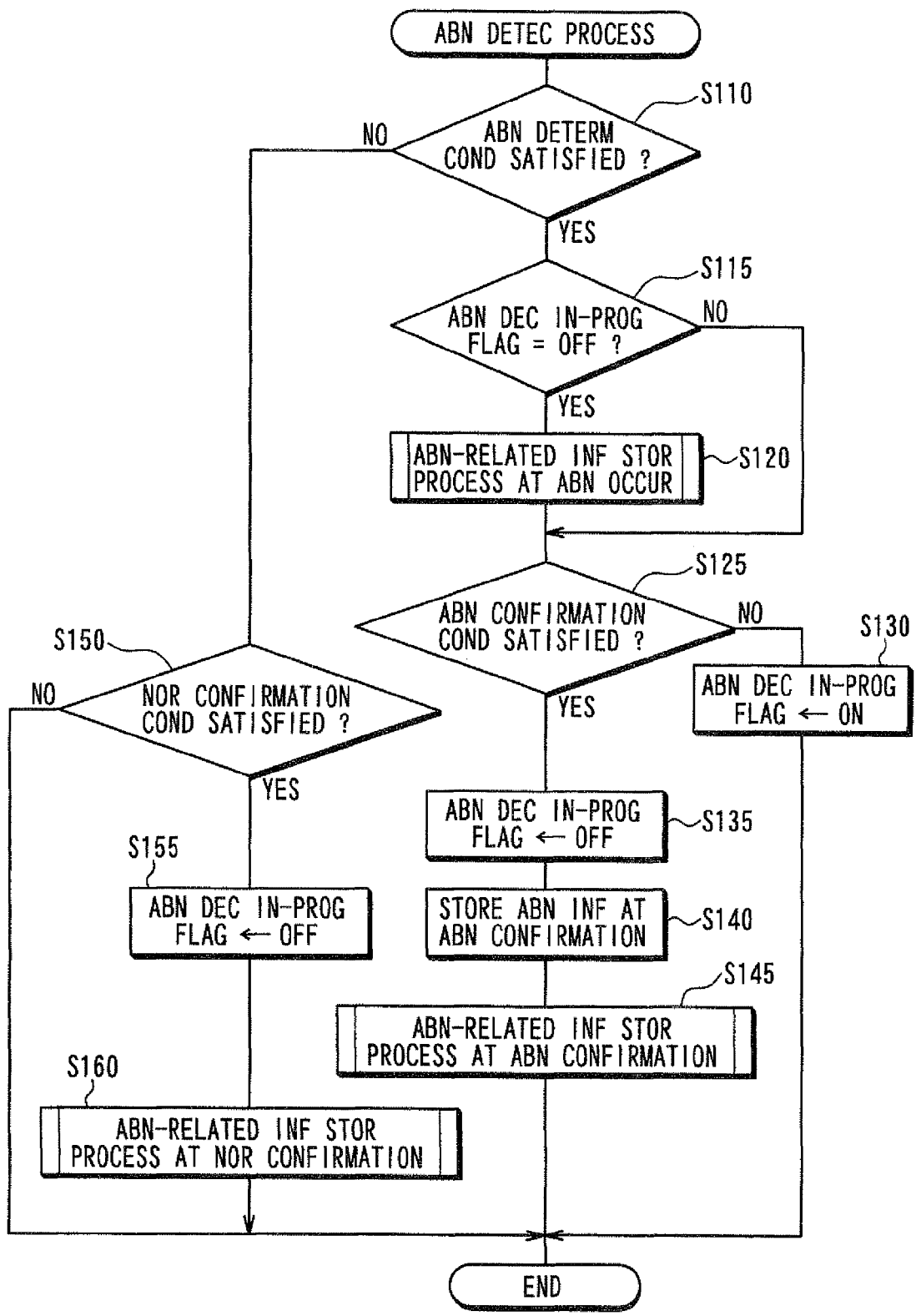
FIG. 4 is a flowchart illustrating an abnormality detection process.

Each abnormality detection section 21 performs an abnormality detection process in FIG. 4 on the corresponding diagnostic object at a specified time interval. In other words, the CPU of the microcomputer 12 performs the abnormality detection process in FIG. 4 on each diagnostic object at a specified time interval. The time interval may or may not be identical for the abnormality detection sections 21.

The abnormality detection section 21 starts the abnormality detection process as shown in FIG. 4. At step S110, the process determines whether the abnormality determination condition is satisfied for the corresponding diagnostic object, in other words, whether the corresponding diagnostic object satisfies the abnormality determination condition. When the abnormality determination condition is satisfied, the process determines that an abnormality occurs on the diagnostic object. The process proceeds to S115 and determines whether the abnormality decision in progress flag for itself is turned off.

When the abnormality decision in progress flag is not turned off or is turned on, the process proceeds to S125. When the abnormality decision in progress flag is not turned off, the process proceeds to S120 assuming that an abnormality is first detected on the diagnostic object at S110. This also signifies that an abnormality occurs and is determined for the first time. The process performs an abnormality-related information storage process at abnormality occurrence to be described later with reference to FIG. 5 and then proceeds to S125. The abnormality diagnosis state storage area of the storage device 22 stores the abnormality decision in progress flag corresponding to each abnormality detection section 21.

At S125, the process determines whether an abnormality confirmation condition is satisfied. Specifically, the abnormality counter is incremented to measure the successive count of determining the abnormality determination condition to be satisfied (determining occurrence of an abnormality) at S110. The process determines whether the abnormality counter value reaches the abnormality confirming threshold value specified for the corresponding diagnostic object. When the abnormality counter value reaches the abnormality confirming threshold value, the process determines that the abnormality confirmation condition is satisfied.

When it is determined at S125 that the abnormality confirmation condition is not satisfied, the process proceeds to S130. The process performs a write process for turning on the abnormality decision in progress flag of itself and then terminates.

When it is determined at S125 that the abnormality confirmation condition is satisfied, the process confirms that the diagnostic object is abnormal. The process proceeds to S135 and performs a write process for turning off the abnormality decision in progress flag of itself.

At S140, the process stores abnormal information at abnormality confirmation in the abnormality confirmation information storage area of the storage device 22. The abnormal information at abnormality confirmation includes identification information about the corresponding diagnostic object, i.e., identification information about the diagnostic object confirmed to be abnormal. In addition, the time information at that time may be stored as the abnormal information. At S145, the process performs an abnormality-related information storage process at abnormality confirmation to be described later with reference to FIG. 6 and then terminates.

When it is determined at S110 that the abnormality determination condition is not satisfied for the corresponding diagnostic object, the process proceeds to S150. In this case, the abnormality counter is cleared to zero, though not shown in the drawing. In this example, determining the abnormality determination condition to be not satisfied at S110 is equivalent to determining the normality determination condition to be satisfied, i.e., determining that the diagnostic object satisfies the normality determination condition.

At S150, the process determines whether the normality confirmation condition is satisfied. Specifically, the normality counter is incremented to measure the successive count of determining the abnormality determination condition not to be satisfied (the normality determination condition to be satisfied) at S110. The process determines whether the normality counter value reaches the normality confirming threshold value specified for the corresponding diagnostic object. When the normality counter value reaches the normality confirming threshold value, the process determines that the normality confirmation condition is satisfied. When it is determined at S110 that the abnormality determination condition is satisfied (i.e., the normality determination condition is not satisfied), the normality counter is cleared to zero, though not shown in the drawing.

When it is determined at S150 that the normality confirmation condition is not satisfied, the abnormality detection process terminates. When it is determined at S150 that the normality confirmation condition is satisfied, the process confirms that the diagnostic object is normal. In this case, the process proceeds to S155 and performs a write process for turning off the abnormality decision in progress flag of itself. At S160, the process performs an abnormality-related information deletion process for the normality confirmation to be described later with reference to FIG. 7 and then terminates.

For example, let us suppose that the diagnostic object is an oxygen sensor (hereafter referred to as an $O_2$ sensor) that detects the oxygen concentration in the exhaust gas. The abnormality determination condition used at S110 may specify that an output value from the $O_2$ sensor exceeds a high-side threshold value VthH and does not become smaller than a low-side threshold value VthL smaller than the high-side threshold value VthH.

Step S147 (not shown) may be added between S110 and S150 when the abnormality determination condition and the normality determination condition are provided separately. When determining at S110 that the abnormality determination condition is not satisfied, the process proceeds to S147 and determines whether normality determination condition is satisfied. When the normality determination condition is not satisfied, the abnormality detection process terminates. When the normality determination condition is satisfied, the process proceeds to S150. In this case, let us suppose that the diagnostic object is an $O_2$ sensor. The abnormality determination condition used at S110 may specify that an output value from the $O_2$ sensor is within an abnormality determination range for determining the abnormality. The normality determination condition used at S147 may specify that an output value from the $O_2$ sensor is outside the abnormality determination range and is within a normality determination range for determining the normality.

Figure 5:
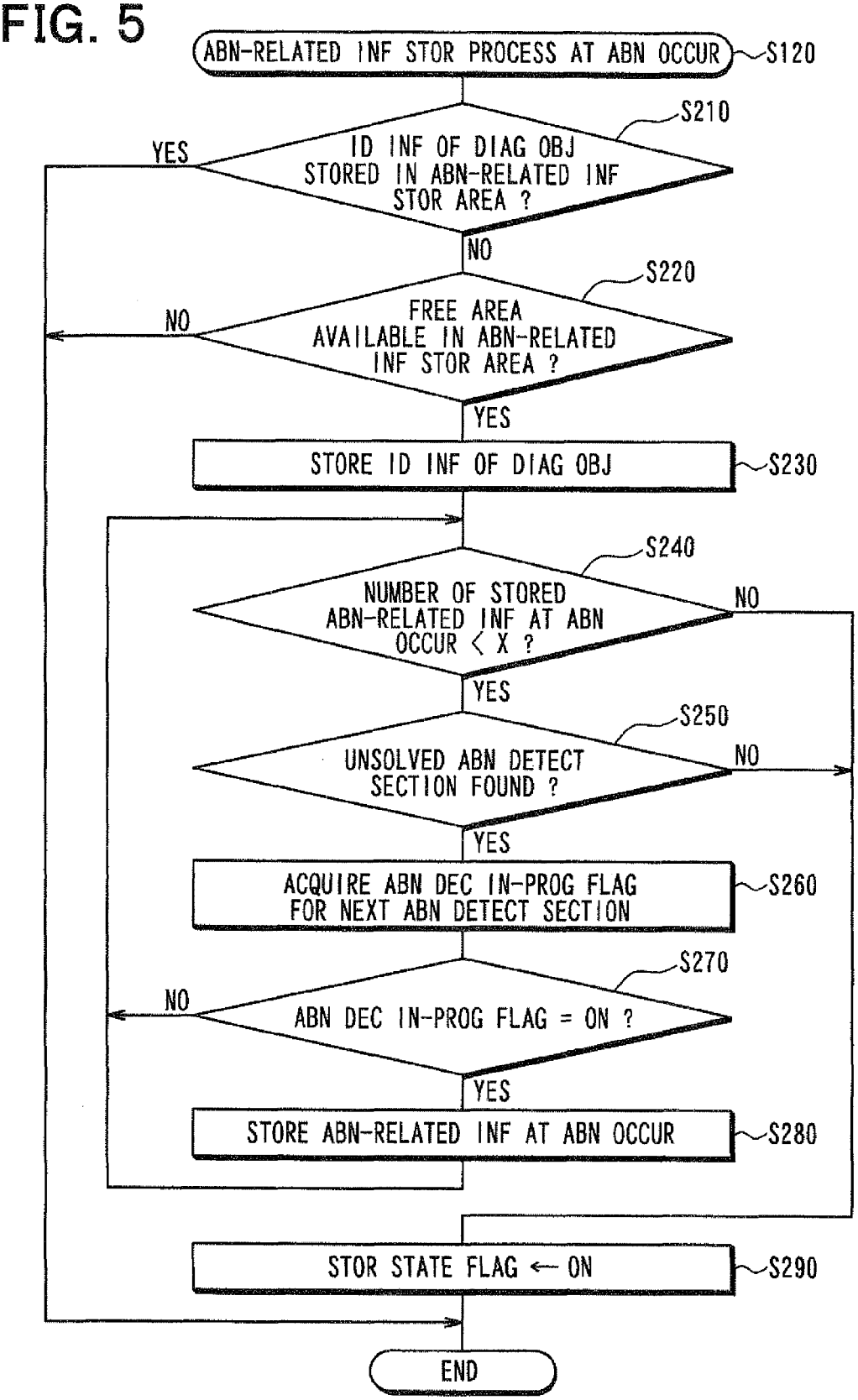
FIG. 5 is a flowchart illustrating an abnormality-related information storage process when an abnormality occurs.

FIG. 5 is a flowchart showing an abnormality-related information storage process performed at S120 in FIG. 4 when an abnormality occurs.

At S210 as shown in FIG. 5, the abnormality-related information storage process at abnormality occurrence determines whether identification information about the corresponding diagnostic object is stored as abnormality location information in the abnormality-related information storage area 22a of the storage device 22 (see FIG. 3). When the identification information about the corresponding diagnostic object is already stored, the abnormality-related information storage process at abnormality occurrence terminates. When the identification information about the corresponding diagnostic object is not stored, the process proceeds to S220.

At S220, the process determines whether the abnormality-related information storage area 22a of the storage device 22 contains a free area. Specifically, the process determines whether as many as M abnormality-specific storage areas 23 in the abnormality-related information storage area 22a contain the abnormality-specific storage area 23 having the first area 23a being free to store the abnormality location information.

When the abnormality-related information storage area 22a does not contain a free area, the abnormality-related information storage process for the abnormality occurrence terminates. When the abnormality-related information storage area 22a contains a free area, the process proceeds to S230.

At S230, the process stores the identification information about the corresponding diagnostic object as the abnormality location information in the abnormality-related information storage area 22a of the storage device 22. Specifically, the process stores the identification information about the corresponding diagnostic object as the abnormality location information in the free first area 23a of the abnormality-specific storage area 23 of the abnormality-related information storage area 22a.

The process proceeds to S240. The abnormality-related information storage area 22a includes the abnormality-specific storage area 23 whose first area 23a stores the identification information about the corresponding diagnostic object. The abnormality-specific storage area 23 also includes the second area 23b that stores abnormality-related information at abnormality occurrence. At S240, the process determines whether the number of pieces of abnormality-related information at abnormality occurrence stored in the second area 23b is smaller than an upper bound (X). The number of pieces of abnormality-related information at abnormality occurrence is hereafter referred to as an abnormality-related information storage count at abnormality occurrence. That is, the process determines whether the second area 23b contains a free area.

When determining at S240 that the abnormality-related information storage count at abnormality occurrence is smaller than the upper bound, the process proceeds to S250. The process determines whether an unsolved abnormality detection section 21 is included in the other abnormality detection sections 21 than that corresponding to itself. The unsolved abnormality detection section 21 is defined as having the abnormality decision in progress flag whose on/off state is not yet determined by processes at S260 and S270 to be described later. When an unsolved abnormality detection section 21 is found, the process proceeds to S260.

At S260, the process acquires the abnormality decision in progress flag for the unsolved abnormality detection section 21 from the abnormality diagnosis state storage area of the storage device 22. At S270, the process determines whether the acquired abnormality decision in progress flag is turned on. When the abnormality decision in progress flag is not turned on, the process returns to S240.

When determining at S270 that the abnormality decision in progress flag is turned on, the process proceeds to S280. At S280, the process stores one piece of abnormality-related information at abnormality occurrence in the second area 23b of the abnormality-specific storage area 23 whose first area 23a stores the identification information about the corresponding diagnostic object. The abnormality-related information contains two pieces of information. One is the identification information about the diagnostic object for the abnormality detection section 21 corresponding to the turned-on abnormality decision in progress flag, i.e., the identification information about the diagnostic object for the other abnormality detection section 21 in which the abnormality decision is in progress. The other is the abnormality decision degree for that abnormality detection section 21. The process then returns to S240.

Each abnormality detection section 21 may be requested from the other abnormality detection sections 21 to provide information to be stored as the abnormality-related information. In such a case, the requested abnormality detection section 21 provides the requesting abnormality detection section 21 with the identification information about the corresponding diagnostic object and the abnormality decision degree. For example, the RAM in the microcomputer 12 is used to exchange requests and information between the abnormality detection sections 21. At S280, the process requests information to be stored as the abnormality-related information from the abnormality detection section 21 whose abnormality decision in progress flag is determined to be turned on at S270. In this manner, the process acquires the information to be stored, i.e., the identification information about the diagnostic object and the abnormality decision degree. For example, the ROM or the storage device 22 in the microcomputer 12 may store a map that contains the identification information about the diagnostic object for each abnormality detection section 21. At S280, from that map, the process can acquire the identification information about the diagnostic object for the abnormality detection section 21 whose abnormality decision in progress flag is determined to be turned on at S270.

At S240, it may be determined that the abnormality-related information storage count at abnormality occurrence is not less than the upper bound. That is, the intended second area 23b is full and additional abnormality-related information cannot be stored. At S250, it may be determined that an unsolved abnormality detection section 21 is not found. In both cases, the process proceeds to S290.

At S290, the process turns on a storage state flag and then terminates. The storage state flag indicates that erasable information is stored in the abnormality-related information storage area 22*a* of the storage device 22. The storage state flag is stored in the other areas of the storage device 22 with respect to each of the abnormality detection sections 21.

Each abnormality detection section 21 first determines that an abnormality occurs on the diagnostic object corresponding to itself (YES at S110 and then YES at S115). The abnormality detection section 21 performs the abnormality-related information storage process at abnormality occurrence (S120). Using the abnormality-related information storage process at abnormality occurrence, the abnormality detection section 21 stores the identification information about the corresponding diagnostic object as the abnormality location information in the abnormality-related information storage area 22*a* of the storage device 22 (S230). The abnormality detection section 21 specifies another abnormality detection section 21 whose abnormality decision in progress flag is turned on. The abnormality detection section 21 assumes the identification information about the diagnostic object for the specified abnormality detection section 21 and the abnormality decision degree for the specified abnormality detection section 21 at that time point to be the abnormality-related information. The abnormality detection section 21 stores the abnormality-related information associated with the identification information about the corresponding diagnostic object as the abnormality location information in the abnormality-related information storage area 22*a* of the storage device 22 (S240 through S280).

Figure 6:
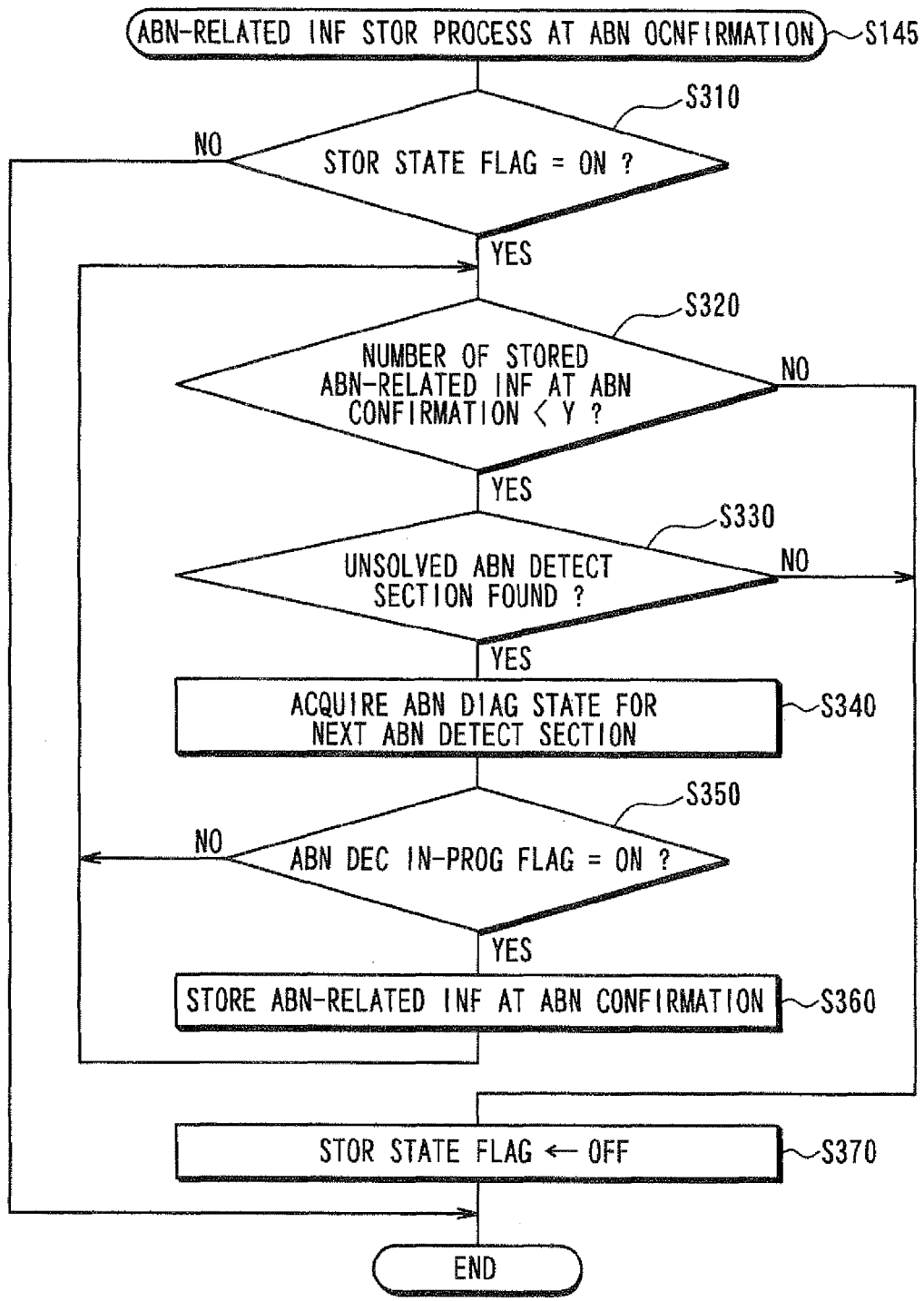
FIG. 6 is a flowchart illustrating an abnormality-related information storage process when an abnormality is determined.

FIG. 6 is a flowchart showing an abnormality-related information storage process at abnormality confirmation performed at S145 in FIG. 4.

As shown in FIG. 6, the abnormality-related information storage process at abnormality confirmation determines at S310 whether the storage state flag for itself (the abnormality detection section 21) is turned on. When the storage state flag is not turned on or is turned off, the abnormality-related information storage process at abnormality confirmation terminates. When the storage state flag is turned on, the process proceeds to S320. The abnormality-related information storage process at abnormality confirmation is performed after an abnormality occurs. Therefore, the storage state flag is turned on at S290 in FIG. 5 except when the determination at S210 results in YES or the determination at S220 results in NO in FIG. 5 as mentioned above. Basically, the abnormality-related information storage process at abnormality confirmation proceeds to S320.

The abnormality-related information storage area 22*a* includes the abnormality-specific storage area 23 whose first area 23*a* stores the identification information about the corresponding diagnostic object. The abnormality-specific storage area 23 also includes the third area 23*c* that stores abnormality-related information at abnormality confirmation. At S320, the process determines whether the number of pieces of abnormality-related information stored in the third area 23*c* is smaller than an upper bound (Y). The number of pieces of abnormality-related information at abnormality confirmation is hereafter referred to as an abnormality-related information storage count at abnormality confirmation. That is, the process determines whether the third area 23*c* contains a free area.

When determining at S320 that the abnormality-related information storage count at abnormality confirmation is smaller than the upper bound, the process proceeds to S330. The process determines whether an unsolved abnormality detection section 21 is included in the other abnormality detection sections 21 than that corresponding to itself. The unsolved abnormality detection section 21 is defined as having the abnormality decision in progress flag whose on/off state is not yet determined by processes at S340 and S350 to be described later. When an unsolved abnormality detection section 21 is found, the process proceeds to S340.

At S340, the process acquires the abnormality decision in progress flag for the unsolved abnormality detection section 21 from the abnormality diagnosis state storage area of the storage device 22. At S350, the process determines whether the acquired abnormality decision in progress flag is turned on. When the abnormality decision in progress flag is not turned on, the process returns to S320.

When determining at S350 that the abnormality decision in progress flag is turned on, the process proceeds to S360. At S360, the process stores one piece of abnormality-related information at abnormality confirmation in the third area 23*c* of the abnormality-specific storage area 23 whose first area 23*a* stores the identification information about the corresponding diagnostic object. The abnormality-related information contains two pieces of information. One is the identification information about the diagnostic object for the abnormality detection section 21 corresponding to the turned-on abnormality decision in progress flag, i.e., the identification information about the diagnostic object for the other abnormality detection section 21 in which the abnormality decision is in progress. The other is the abnormality decision degree for that abnormality detection section 21. The process then returns to S320. At S360, the process acquires information (the identification information and the abnormality decision degree) to be stored as the abnormality-related information at abnormality confirmation in accordance with the same procedure as S280 in FIG. 5 as mentioned above.

At S320, it may be determined that the abnormality-related information storage count at abnormality confirmation is not less than the upper bound. That is, the intended third area 23*c* is full and additional abnormality-related information cannot be stored. At S330, it may be determined that an unsolved abnormality detection section 21 is not found. In both cases, the process proceeds to S370. At S370, the process turns off its own storage state flag and then terminates.

Each abnormality detection section 21 confirms that an abnormality occurs on the diagnostic object corresponding to itself (YES at S125). The abnormality detection section 21 performs the abnormality-related information storage process at abnormality confirmation (S140). Using the abnormality-related information storage process at abnormality confirmation, the abnormality detection section 21 specifies another abnormality detection section 21 whose abnormality decision in progress flag is turned on. The abnormality detection section 21 assumes the identification information about the diagnostic object for the specified abnormality detection section 21 and the abnormality decision degree for the specified abnormality detection section 21 at that time point to be the abnormality-related information (especially at the abnormality confirmation). The abnormality detection section 21 stores the abnormality-related information associated with the identification information about the corresponding diagnostic object as the abnormality location information in the abnormality-related information storage area 22*a* of the storage device 22 (920 through S360).

Figure 7:
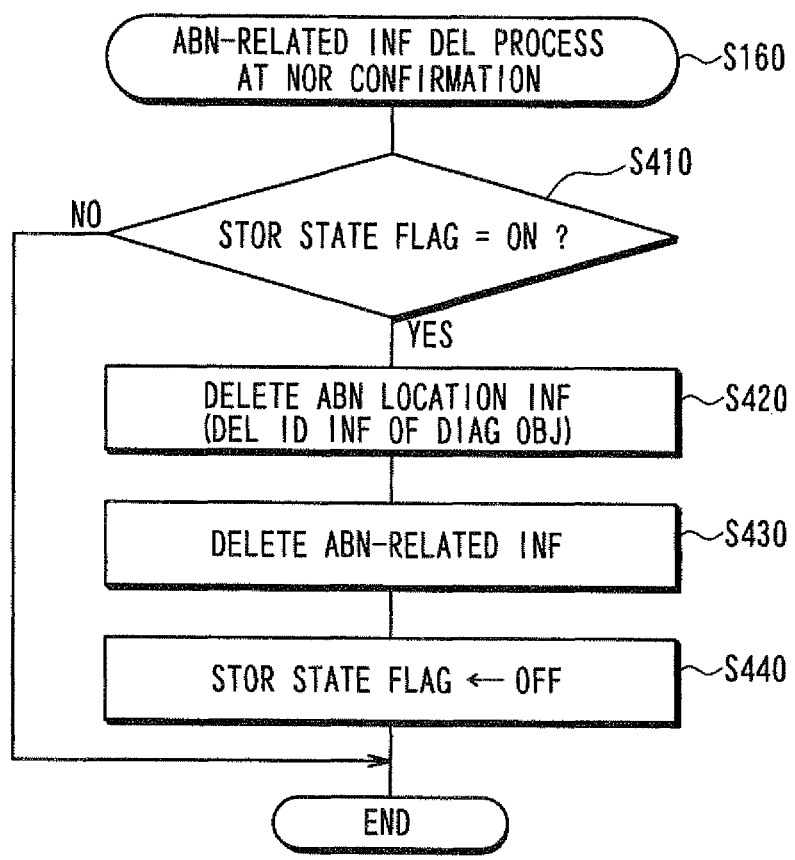
FIG. 7 is a flowchart illustrating an abnormality-related information deletion process when normality is determined.

FIG. 7 is a flowchart showing an abnormality-related information deletion process at normality confirmation performed at S160 in FIG. 4.

As shown in FIG. 7, the abnormality-related information deletion process at normality confirmation determines at S410 whether the storage state flag for itself (the abnormality detection section 21) is turned on. When the storage state flag is not turned on or is turned off, the abnormality-related information deletion process at normality confirmation terminates. When the storage state flag is turned on, the process proceeds to S420.

The storage state flag is turned on at S290 in FIG. 5 and is turned off at S370 in FIG. 6. The process at S420 and later in FIG. 7 is performed when an abnormality is determined to occur on the diagnostic object but is not confirmed and finally the normality is confirmed. The process at S420 and later in FIG. 7 is not performed when the abnormality is confirmed and the normality is confirmed thereafter.

At S420, the process deletes the abnormality location information (identification information about the diagnostic object corresponding to itself) stored in the abnormality-related information storage area 22a of the storage device 22. Specifically, the process clears the first area 23a of the abnormality-specific storage area 23 that stores the identification information about the corresponding diagnostic object.

At S430, the process clears the second area 23b of the abnormality-specific storage area 23 where the first area 23a is cleared at S420. Consequently, the process deletes the abnormality-related information at abnormality occurrence, if any, stored at S280 in FIG. 5 in the abnormality-related information storage area 22a of the storage device 22.

At S440, the process turns off the storage state flag of its own and then terminates.

Each abnormality detection section 21 may confirm that the diagnostic object corresponding to itself is normal without confirming it to be abnormal. In such a case, the abnormality detection section 21 deletes the information (the abnormality location information and the abnormality-related information at abnormality occurrence) stored in the abnormality-related information storage area 22a of the storage device 22 (S420 and S430).

With reference to examples in FIGS. 8 through 10, the following describes actions of the abnormality detection process in FIG. 4 (including the processes in FIGS. 5 through 7) performed by the abnormality detection sections 21.

FIGS. 8 through 10 use two examples of diagnostic object, namely, an $O_2$ sensor and an $O_2$ heater for heating the $O_2$ sensor. In FIGS. 8 through 10, an $O_2$ heater abnormality counter exemplifies the abnormality counter. The abnormality detection section 21 (21a) using the $O_2$ heater as a diagnostic object increments the $O_2$ heater abnormality counter. The $O_2$ heater abnormality counter measures the duration of the satisfied abnormality determination condition (successive count of the condition satisfied) on the $O_2$ heater. Likewise, an $O_2$ sensor abnormality counter exemplifies the abnormality counter. The abnormality detection section 21 (21b) using the $O_2$ sensor as a diagnostic object increments the $O_2$ sensor abnormality counter. The $O_2$ sensor abnormality counter measures the duration of the satisfied abnormality determination condition (successive count of the condition satisfied) on the $O_2$ sensor. In FIGS. 8 through 10, a percentage (%) signifies the abnormality decision degree. At the bottom of FIGS. 8 through 10, blocks enclosed in broken lines indicate the abnormality location information, the abnormality-related information at abnormality occurrence, and the abnormality-related information at abnormality confirmation stored in the abnormality-related information storage area 22a of the storage device 22. "NULL" enclosed in the broken line signifies that the corresponding information is not written. The identification information about the $O_2$ sensor is represented as P0130. The identification information about the $O_2$ heater is represented as P0135.

Figure 8A:
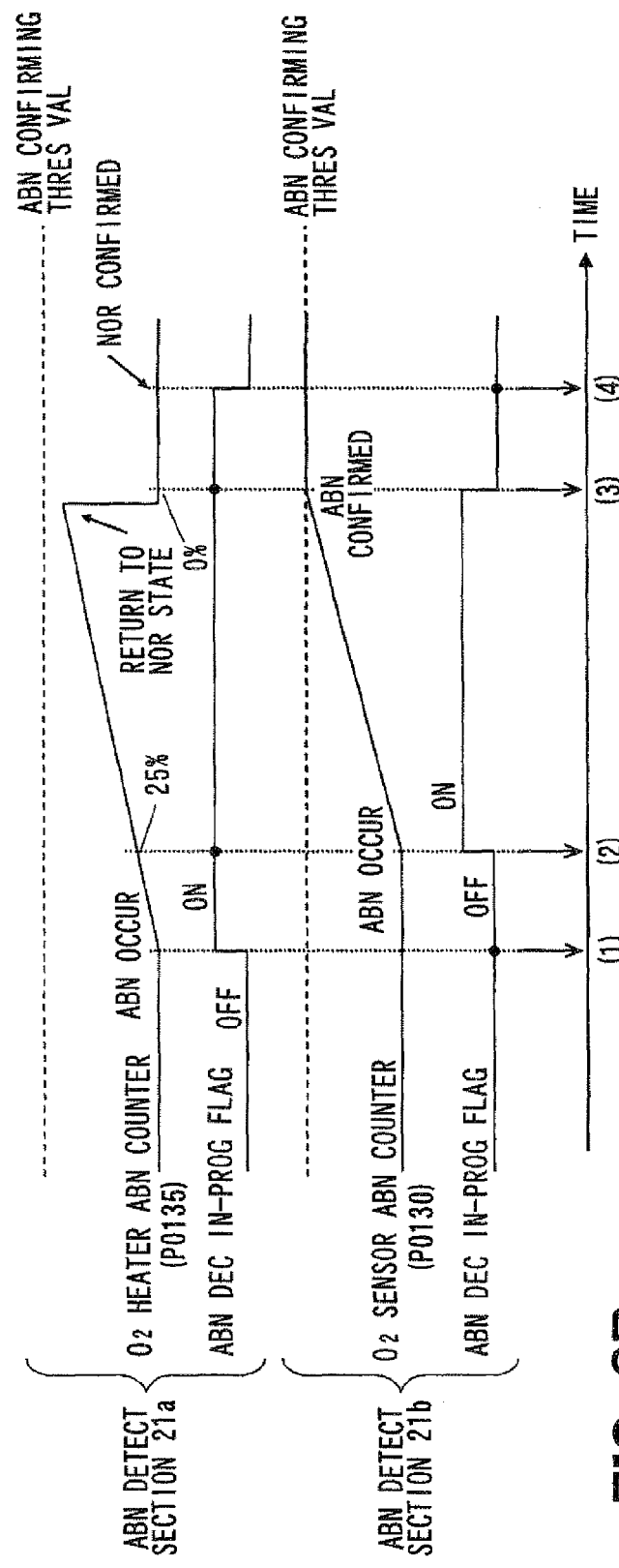
FIGS. 8A and 8B are diagrams illustrating a first example of actions.
Figure 8B:
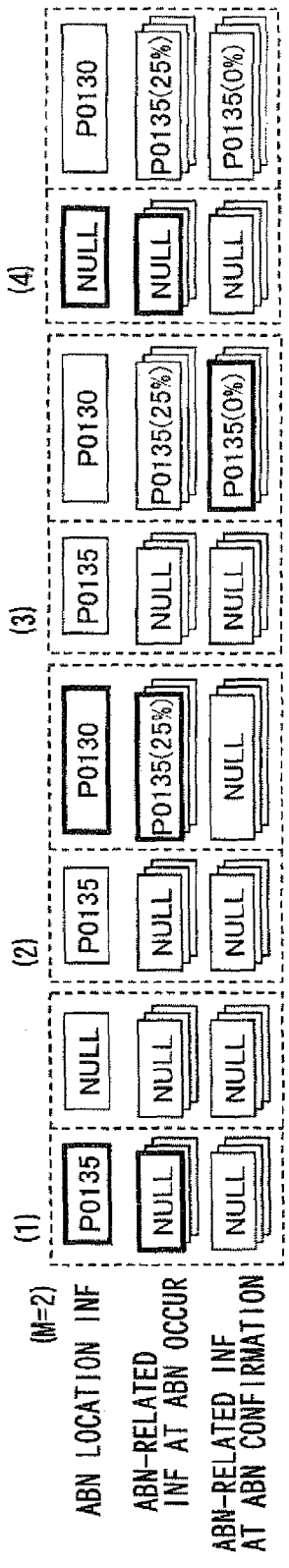

FIGS. 8A and 8B illustrates a first example. In this example, an abnormality of the $O_2$ heater affects the $O_2$ sensor and causes the $O_2$ sensor to be abnormal. The $O_2$ heater abnormality, the cause of the $O_2$ sensor abnormality, is solved afterward and the $O_2$ heater is finally confirmed to be normal.

An abnormality occurs on the $O_2$ heater at time point (1) in FIGS. 8A and 8B. The abnormality detection section 21a for the $O_2$ heater detects the abnormality occurrence (YES at S110).

The abnormality detection section 21a for the $O_2$ heater then performs the abnormality-related information storage process at abnormality occurrence (S120 in FIG. 5). The abnormality detection section 21a stores $O_2$ heater identification information P0135 as the abnormality location information in the abnormality-related information storage area 22a of the storage device 22 (S230). The abnormality detection section 21a references the abnormality decision in progress flag of the abnormality detection section 21b for the $O_2$ heater (S260 and S270). At this time point, the $O_2$ sensor is unaffected by the $O_2$ heater abnormality and remains normal. The abnormality decision in progress flag of the abnormality detection section 21b remains off. Accordingly, the abnormality detection section 21a does not store the abnormality-related information and stores only the $O_2$ heater identification information (P0135) in the abnormality-related information storage area 22a. The abnormality detection section 21a reverses its own abnormality decision in progress flag (the abnormality decision in progress flag on the $O_2$ heater) from OFF to ON (S130).

At time point (2), the $O_2$ sensor is affected by the $O_2$ heater and becomes abnormal. The abnormality detection section 21b for the $O_2$ sensor detects this state (YES at S110). The abnormality detection section 21b performs the abnormality-related information storage process at abnormality occurrence (S120 in FIG. 5). The abnormality detection section 21b stores $O_2$ sensor identification information P0130 as the abnormality location information in the abnormality-related information storage area 22a (S230). The abnormality detection section 21b references the abnormality decision in progress flag of the abnormality detection section 21a for the $O_2$ heater (S260 and S270). At this time point, the abnormality decision in progress flag of the abnormality detection section 21a is already turned on. Accordingly, the abnormality detection section 21b stores $O_2$ sensor identification information P0130 as the abnormality location information. In addition, the abnormality detection section 21b stores the $O_2$ heater identification information P0135 and the abnormality decision degree (25% in this example) for the abnormality detection section 21a at that time point in the abnormality-related information storage area 22a (S280). These pieces of information are stored as the abnormality-related information at abnormality occurrence corresponding to P0130 as the abnormality location information. The abnormality detection section 21b reverses its own abnormality decision in progress flag (the abnormality decision in progress flag on the $O_2$ sensor) from OFF to ON (S130).

At time point (3), the $O_2$ sensor abnormality counter value reaches the abnormality confirming threshold value defined for the $O_2$ sensor. The abnormality detection section 21b for the $O_2$ sensor confirms that the $O_2$ sensor is abnormal (YES at S125). The abnormality detection section 21b reverses its own abnormality decision in progress flag from ON to OFF (S135) and performs the abnormality-related information storage process at abnormality confirmation (S145 in FIG. 6). The abnormality detection section 21b references the abnormality decision in progress flag of the abnormality detection section 21a for the $O_2$ heater (S340 and S350).

At this time point, the $O_2$ heater returns to be normal but is not confirmed to be normal yet. The abnormality decision in progress flag of the abnormality detection section 21a for the $O_2$ heater remains turned on. Accordingly, the abnormality detection section 21b for the $O_2$ sensor stores $O_2$ heater identification information P0135 and the abnormality decision degree (0% in this example) for the abnormality detection section 21a at that time point in the abnormality-related information storage area 22a (S360). These pieces of information are stored as the abnormality-related information at abnormality confirmation corresponding to P0130 as the abnormality location information.

At time point (4), the abnormality detection section 21a for the $O_2$ heater confirms that the $O_2$ heater is normal (YES at S150). The abnormality detection section 21a reverses its own abnormality decision in progress flag from ON to OFF (S155). In addition, the abnormality detection section 21a performs the abnormality-related information deletion process at normality confirmation (S160 in FIG. 7). The abnormality detection section 21a then deletes the abnormality location information stored by itself in the abnormality-related information storage area 22a and the abnormality-related information at abnormality occurrence corresponding to the abnormality location information (S420 and S430).

Figure 9A:
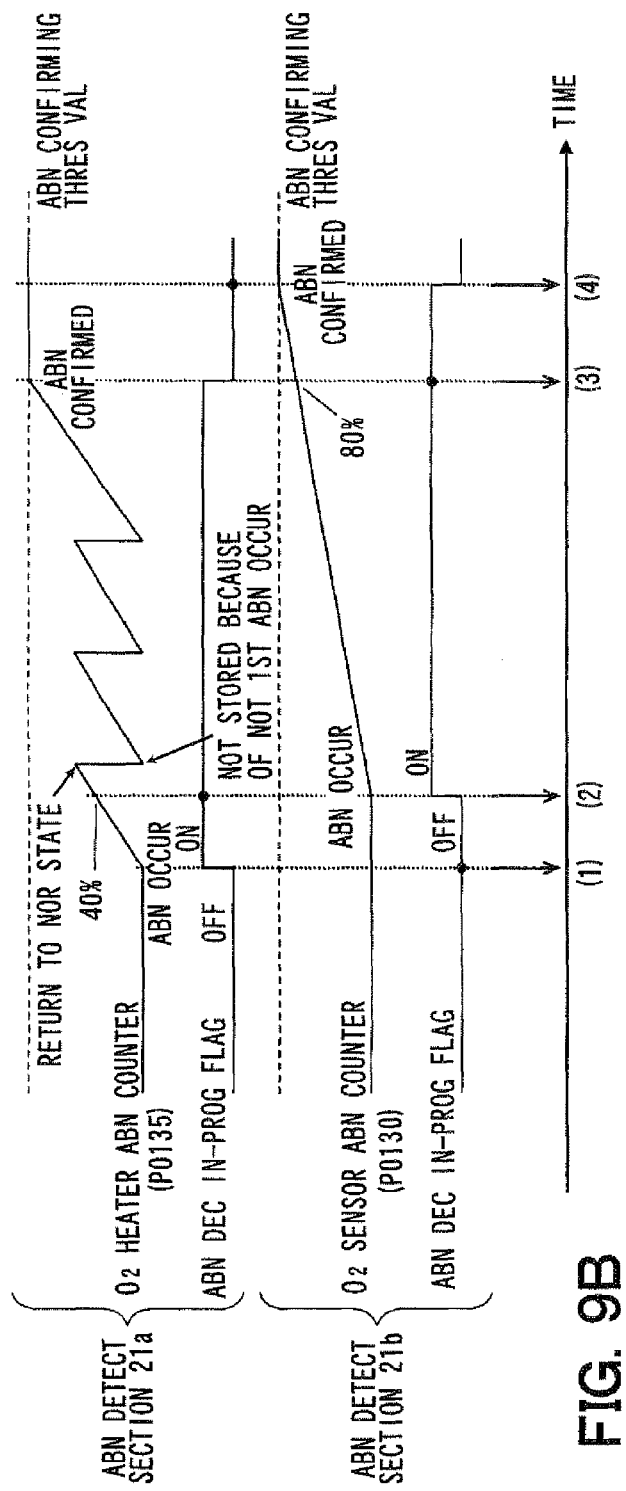
FIGS. 9A and 9B are diagrams illustrating a second example of actions.
Figure 9B:
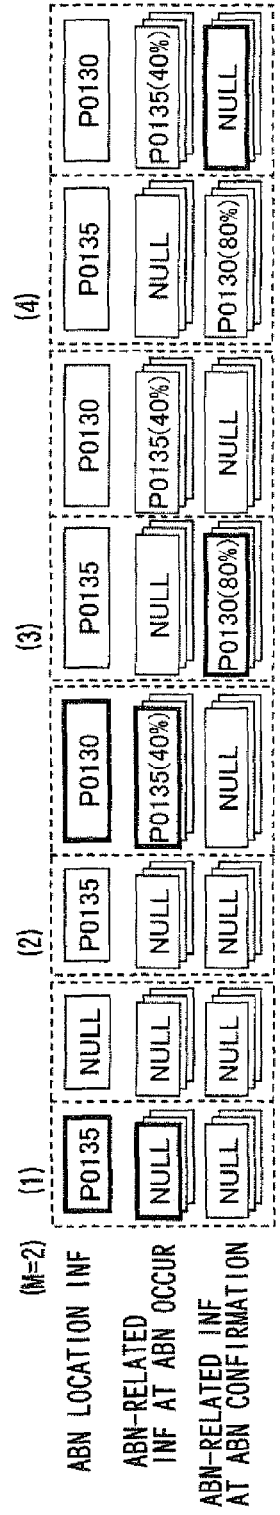

FIGS. 9A and 9B illustrates a second example. Similarly to FIGS. 8A and 8B, the second example shows that an abnormality of the $O_2$ heater causes an abnormality of the $O_2$ sensor. The second example differs from the first one in that the $O_2$ heater abnormality as the cause of the $O_2$ sensor abnormality is indefinite.

In FIGS. 9A and 9B, operations from time points (1) to (2) are equal to those in FIGS. 8A and 8B and a description is omitted for simplicity. At time point (2) in FIGS. 9A and 9B, however, the abnormality detection section 21a for the $O_2$ heater indicates the abnormality decision degree of 40%. The abnormality detection section 21b for the $O_2$ sensor stores the degree of 40% along with the $O_2$ heater identification information (P0135) in the abnormality-related information storage area 22a. These pieces of information are stored as the abnormality-related information at abnormality occurrence corresponding to P0130 as the abnormality location information.

After time point (2) in FIGS. 9A and 9B, the $O_2$ heater abnormality is indefinite. At time point (3), the $O_2$ heater abnormality counter value reaches the abnormality confirming threshold value.

At time point (3), the abnormality detection section 21a for the $O_2$ heater confirms that the $O_2$ heater is abnormal (YES at S125). The abnormality detection section 21a reverses its abnormality decision in progress flag from ON to OFF (S135). In addition, the abnormality detection section 21a performs the abnormality-related information storage process at abnormality confirmation (S145 in FIG. 6). The abnormality detection section 21a references the abnormality decision in progress flag of the abnormality detection section 21b for the $O_2$ sensor (S340 and S350). The abnormality decision in progress flag of the abnormality detection section 21b is already turned on. Accordingly, the abnormality detection section 21a stores $O_2$ sensor identification information P0130 and the abnormality decision degree (80% in this example) for the abnormality detection section 21b at that time point in the abnormality-related information storage area 22a (S360). These pieces of information are stored as the abnormality-related information at abnormality confirmation corresponding to P0130 as the abnormality location information.

At time point (4), the $O_2$ sensor abnormality counter value reaches the abnormality confirming threshold value. The abnormality detection section 21b for the $O_2$ sensor confirms that the $O_2$ sensor is abnormal (YES at S125). The abnormality detection section 21b reverses its abnormality decision in progress flag from ON to OFF (S135). In addition, the abnormality detection section 21b performs the abnormality-related information storage process at abnormality confirmation (S145 in FIG. 6). The abnormality detection section 21b references the abnormality decision in progress flag of the abnormality detection section 21a for the $O_2$ heater (S340 and S350). At that time point, the abnormality decision in progress flag of the abnormality detection section 21a is turned off. Accordingly, the abnormality detection section 21b does not store heater identification information P0135 as the abnormality-related information at abnormality confirmation (NO at S350).

FIGS. 10A and 10B illustrates a third example. Similarly to FIGS. 8A and 8B, the third example shows that an abnormality of the $O_2$ heater causes an abnormality of the $O_2$ sensor. The third example differs from the first one in that the order of abnormality confirmation for both diagnostic objects is reverse to the order of abnormality occurrence.

In FIGS. 10A and 10B, operations from time points (1) to (2) are equal to those in FIGS. 8A and 8B and a description is omitted for simplicity. At time point (2) in FIGS. 10A and 10B, however, the abnormality detection section 21a for the $O_2$ heater indicates the abnormality decision degree of 35%. The abnormality detection section 21b for the $O_2$ sensor stores the degree of 35% along with the $O_2$ heater identification information (P0135) in the abnormality-related information storage area 22a. These pieces of information are stored as the abnormality-related information at abnormality occurrence corresponding to P0130 as the abnormality location information.

At time point (3) in FIGS. 10A and 10B, the $O_2$ sensor abnormality counter value reaches the abnormality confirming threshold value.

At time point (3), the abnormality detection section 21b for the $O_2$ sensor confirms that the $O_2$ sensor is abnormal (YES at S125). The abnormality detection section 21b reverses its abnormality decision in progress flag from ON to OFF (S135). In addition, the abnormality detection section 21b performs the abnormality-related information storage process at abnormality confirmation (S145 in FIG. 6). The abnormality detection section 21b references the abnormality decision in progress flag of the abnormality detection section 21a for the $O_2$ heater (S340 and S350).

At that time point, the $O_2$ heater is not confirmed to be abnormal yet. The abnormality decision in progress flag of the abnormality detection section 21a for the $O_2$ heater remains turned on. The abnormality detection section 21a indicates the abnormality decision degree of 70%. The abnormality detection section 21b for the $O_2$ sensor stores the $O_2$ heater identification information (P0135) and the abnormality decision degree of 70% for the abnormality detection section 21a in the abnormality-related information storage area 22a (S360). These pieces of information are stored as the abnormality-related information at abnormality confirmation corresponding to P0130 as the abnormality location information.

At time point (4), the $O_2$ heater abnormality counter value reaches the abnormality confirming threshold value. The abnormality detection section 21a for the $O_2$ heater confirms that the $O_2$ heater is abnormal (YES at S125). The abnormality detection section 21a reverses its abnormality decision in progress flag from ON to OFF (S135). The abnormality detection section 21a then performs the abnormality-related information storage process at abnormality confirmation (S145 in FIG. 6). The abnormality detection section 21a references the abnormality decision in progress flag of the abnormality detection section 21b for the $O_2$ sensor (S340 and S350). At that time point, the abnormality decision in progress flag of the abnormality detection section 21b for the $O_2$ sensor is already turned off. Therefore, the abnormality detection section 21a does not store the $O_2$ sensor identification information (P0130) as the abnormality-related information at abnormality confirmation (NO at S350).

With reference to FIG. 11, the following describes an output process performed by the CPU of the microcomputer 12 in ECU 1 independently of the process that provides the function as each abnormality detection section 21. For example, the output process is performed periodically to output information about abnormalities stored in the storage device 22 in response to a request from the scan tool 13.

At S510 in FIG. 11, the output process determines whether an abnormal information output request is received from the scan tool 13. When the abnormal information output request is not received, the output process terminates. When the abnormal information output request is received, the process proceeds to S520.

At S520, the process transmits the identification information about a diagnostic object confirmed to be abnormal and the abnormality-related information about the diagnostic object to the scan tool 13.

Specifically, the process determines whether the abnormality confirmation information storage area of the storage device 22 stores identification information about any of diagnostic objects. The identification information, if any, is stored as the abnormal information at abnormality confirmation at S140 in FIG. 4 and is associated with a diagnostic object that is confirmed to be abnormal by any of the abnormality detection sections 21. When the identification information is available, the process searches for the abnormality-specific storage area 23 whose first area 23a stores information equivalent to that identification information. That abnormality-specific storage area 23 belongs to as many as M abnormality-specific storage areas 23 in the abnormality-related information storage area 22a of the storage device 22 and is hereafter referred to as the transmission-targeted abnormality-specific storage area 23.

When the transmission-targeted abnormality-specific storage area 23 is available, the process transmits information stored in the first area 23a through the third area 23c of that abnormality-specific storage area 23 as one group of data to the scan tool 13. Accordingly, three pieces of information are transmitted as a set to the scan tool. The set includes: the identification information about the diagnostic object confirmed to be abnormal; the abnormality-related information at abnormality occurrence, i.e., the abnormality-related information stored when an abnormality is first determined to occur on the diagnostic object; and the abnormality-related information at abnormality confirmation, i.e., the abnormality-related information stored when the diagnostic object is confirmed to be abnormal.

When multiple transmission-targeted abnormality-specific storage areas 23 are available, the process first transmits, to the scan tool 13, the information in the abnormality-specific storage area 23 that stores the identification information about the diagnostic object first confirmed to be abnormal as the abnormality location information.

The output process terminates when the information transmission to the scan tool 13 is completed at S520.

In response to a user operation, the scan tool 13 transmits a request to the ECU 11 for outputting the abnormal information. The scan tool 13 then receives the information transmitted at S520 from the ECU 11.

As shown in FIG. 12, for example, the scan tool 13 uses its display device to display the contents of the information received from the ECU 11.

FIG. 12A shows the display content of the first example as shown in FIGS. 8A and 8B. FIG. 12B shows the display content of the second example as shown in FIGS. 9A and 9B. FIG. 12C shows the display content of the third example as shown in FIGS. 10A and 10B. Specifically, FIG. 12A shows the display content based on information (4) enclosed by broken lines in FIGS. 8A and 8B. FIG. 12B shows the display content based on information (4) enclosed by broken lines in FIGS. 9A and 9B. FIG. 12C shows the display content based on information (4) enclosed by broken lines in FIGS. 10A and 10B.

As shown in FIG. 12, the scan tool 13 displays "detected abnormality" to represent the name of a diagnostic object indicated by the identification information about the diagnostic object confirmed to be abnormal, i.e., the name of the diagnostic object confirmed to be abnormal. The scan tool 13 displays "other abnormality at abnormality occurrence" to represent the name of a diagnostic object indicated by the abnormality-related information at abnormality occurrence. The scan tool 13 displays "other abnormality at abnormality confirmation" to represent the name of a diagnostic object indicated by the abnormality-related information at abnormality confirmation. In this example, the scan tool 13 displays the names for "detected abnormality" from the left to the right in the order of the diagnostic objects confirmed to be abnormal. The scan tool 13 displays "progress lever" to represent the abnormality decision degree.

Using the display contents in FIG. 12A, for example, a user or a vehicle maintenance worker of the scan tool 13 can understand that only the $O_2$ sensor is confirmed to be abnormal but an abnormality also occurred on the $O_2$ heater before it occurred on the $O_2$ sensor. Based on the display contents, he or she can estimate that the $O_2$ heater may be also abnormal and the $O_2$ heater abnormality may cause the $O_2$ sensor abnormality.

The display contents in FIG. 12B also indicate that an abnormality occurrence on the $O_2$ heater precedes an abnormality occurrence on the $O_2$ sensor. It is made clear that the $O_2$ heater abnormality preceded the $O_2$ sensor abnormality even though the $O_2$ heater abnormality is indefinite as shown in FIGS. 9A and 9B. It can be assumed that the $O_2$ heater abnormality might cause the $O_2$ sensor abnormality. This effect is unchanged even when the $O_2$ heater is confirmed to be abnormal after the $O_2$ sensor is confirmed to be abnormal.

The display contents in FIG. 12C also indicate that an abnormality occurrence on the $O_2$ heater precedes an abnormality occurrence on the $O_2$ sensor. It is made clear that an abnormality occurred on the $O_2$ heater at both the abnormality occurrence and the abnormality confirmation on the $O_2$ sensor. It is possible to understand the situation that the $O_2$ heater became abnormal before the $O_2$ sensor, but was not confirmed to be abnormal or normal at the abnormality confirmation of the $O_2$ sensor, and was confirmed to be abnormal after the $O_2$ sensor.

The ECU 11 may receive the abnormal information output request or another output request from the scan tool 13. In such a case, the ECU 11 may transmit not only the information about the diagnostic object confirmed to be abnormal but also information stored in the abnormality-specific storage areas 23 of the abnormality-related information storage area 22a to the scan tool 13. The scan tool 13 may display the contents of the received information.

As mentioned above, each abnormality detection section 21 first determines that an abnormality occurs on the corresponding diagnostic object (first abnormality determination). At this time, the ECU 11 stores the identification information about the corresponding diagnostic object as the abnormality location information in the abnormality-related information storage area 22a of the storage device 22. In addition, the ECU 11 specifies another abnormality detection section 21 whose abnormality decision in progress flag is turned on. The ECU 11 stores the identification information about the diagnostic object corresponding to the specified abnormality detection section 21 as the abnormality-related information (especially at abnormality occurrence) in the abnormality-related information storage area 22a in association with the identification information about the corresponding diagnostic object as the abnormality location information.

When an abnormality occurrence is first determined on diagnostic object X, the abnormality-related information storage area 22a stores identification information IDx about diagnostic object X as the abnormality location information. There may be another diagnostic object Y that became abnormal before the first abnormality determination and is not confirmed to be normal or abnormal yet. In this case, the abnormality-related information storage area 22a stores identification information IDy about diagnostic object Y as the abnormality-related information at abnormality occurrence on diagnostic object X in association with identification information IDx as the abnormality location information.

Accordingly, the above-mentioned effects (a) through (c) are provided. It is possible to correctly and easily understand the order of multiple abnormalities occurred on a vehicle and improve the ease of the diagnosis. The abnormality-related information storage area 22a of the storage device 22 is equivalent to the above-mentioned storage section.

When each abnormality detection section 21 confirms that the corresponding diagnostic object is abnormal (abnormality confirmation), the abnormality detection section 21 specifies another abnormality detection section whose abnormality decision in progress flag is turned on. The abnormality-related information storage area 22a stores the identification information about the diagnostic object corresponding to the specified abnormality detection section 21 as the abnormality-related information (especially at abnormality confirmation) in association with the identification information about the corresponding diagnostic object as the abnormality location information.

Even when diagnostic object X is confirmed to be abnormal, there may be another diagnostic object Y that became abnormal prior to diagnostic object X confirmed to be abnormal and is not confirmed to be abnormal or normal yet. In such a case, the abnormality-related information storage area 22a stores identification information IDy about diagnostic object Y as the abnormality-related information at abnormality confirmation on diagnostic object X in association with identification information IDx about diagnostic object X as the abnormality location information.

For example, let us suppose that identification information IDy about diagnostic object Y is stored as both the abnormality-related information at abnormality occurrence and the abnormality-related information at abnormality confirmation in terms of diagnostic object X. In such a case, it is possible to understand the situation that diagnostic object Y became abnormal prior to diagnostic object X but is not confirmed to be abnormal or normal yet at the abnormality confirmation of diagnostic object X.

Each abnormality detection section 21 acquires an abnormality decision degree from another abnormality detection section 21 whose abnormality decision in progress flag is turned on. The abnormality-related information storage area 22a also stores the abnormality decision degree as the abnormality-related information.

As mentioned above, let us suppose that the identification information about the $O_2$ heater is stored as the abnormality-related information about the $O_2$ sensor. In this case, the abnormality decision degree stored along with the identification information can notify the progress of the diagnosis on the $O_2$ heater (the degree of confirming the $O_2$ heater to be abnormal) at the abnormality occurrence or the abnormality confirmation on the $O_2$ sensor.

Each abnormality detection section 21 may determine an abnormality occurrence on the corresponding diagnostic object and confirm it to be normal without confirming it to be abnormal. In this case, the abnormality detection section 21 performs the process in FIG. 7 to delete the information stored by itself in the abnormality-related information storage area 22a.

Past information about the diagnostic object confirmed to be normal does not remain in the abnormality-related information storage area 22a. The abnormality-related information storage area 22a can be used efficiently.

The CPU of the microcomputer 12 in the ECU 11 performs the output process in FIG. 11. Owing to this process, a vehicle maintenance worker can easily read the information stored in the abnormality-related information storage area 22a.

According to the embodiment, the process at S110 in FIG. 4 is equivalent to the abnormality occurrence determination unit. The process at S125 in FIG. 4 is equivalent to the abnormality confirming unit. The processes at S110 and S150 in FIG. 4 are equivalent to the normality confirming unit. The processes at S130, S135, and S155 in FIG. 4 are equivalent to the state information generation unit. The output process in FIG. 11 is equivalent to a response unit.

(Second Embodiment)

The second embodiment differs from the ECU 11 according to the first embodiment in the following.

A specific storage area (equivalent to an association information storing unit) of the storage device 22 stores an association table group (equivalent to association information). The association table shows a diagnostic object (hereafter also referred to as an associated diagnostic object) associated with each diagnostic object corresponding to each abnormality detection section 21.

The association table group contains individual association tables each recording the associated diagnostic object corresponding to each diagnostic object. Each association table contains not only the associated diagnostic object but also an index (degree-of-association information) indicating the degree of association of the associated diagnostic object.

Figure 13:
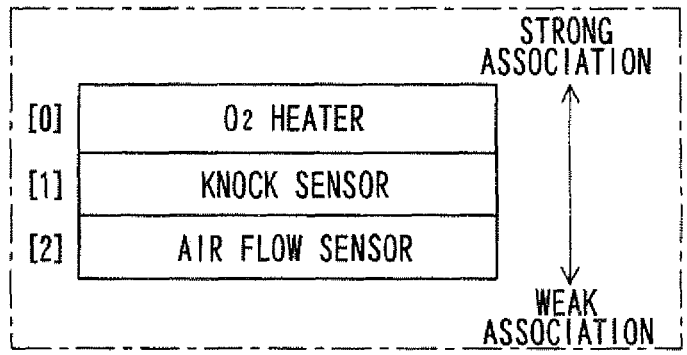
FIG. 13 is a diagram illustrating an association table for an $O_2$ sensor.

For example, FIG. 13 shows an association table for an $O_2$ sensor. The table records an $O_2$ heater, a knock sensor, and an air flow sensor as associated diagnostic objects for the $O_2$ sensor. The index with a smaller numeric value is attached to an associated diagnostic object that is more strongly associated with the $O_2$ sensor. FIG. 13 shows the index as a numeric value enclosed in brackets [ ]. As mentioned above, an associated diagnostic object for diagnostic object X is so configured that an abnormality occurring on the associated diagnostic object may cause diagnostic object X to be also determined to be abnormal. The associated diagnostic object may cause diagnostic object X to be abnormal. For example, an abnormality occurring on the knock sensor or the air flow sensor changes the ignition timing or the injection quantity for each engine cylinder. The oxygen concentration in the exhaust gas varies to influence an output value of the $O_2$ sensor.

At S250 through S270 in FIG. 5 and S330 through S350 in FIG. 6, each abnormality detection section 21 references an association table for the corresponding diagnostic object in the association table group to detect an associated diagnostic object for the corresponding diagnostic object. The abnormality detection section 21 determines the on/off state of the abnormality decision in progress flag only for the other abnormality detection section 21 corresponding to the associated diagnostic object. The abnormality detection section 21 identifies the degrees of association with the associated diagnostic objects for the corresponding diagnostic object based on the indexes contained in the association table. The abnormality detection section 21 first determines the on/off state of the abnormality decision in progress flag for the abnormality detection section 21 corresponding to the associated diagnostic object having the strongest association with the corresponding diagnostic object. That is, the abnormality detection section 21 determines the on/off state of the abnormality decision in progress flag in ascending order of the index values contained in the association table.

The above-mentioned configuration can decrease a processing load on specifying the abnormality detection section 21 whose abnormality decision in progress flag is turned on.

The abnormality-related information storage area 22a stores only information about the diagnostic object associated with diagnostic object X as the abnormality-related information about diagnostic object X. The storage capacity of the abnormality-related information storage area 22a can be used efficiently. Only information about the diagnostic object as a possible cause of the abnormality can be stored as the abnormality-related information. The abnormality cause can be analyzed efficiently.

When the abnormality-related information storage area 22a is scheduled to store the abnormality-related information about diagnostic object X, the on/off state of the abnormality decision in progress flag is preferentially checked for the abnormality detection section 21 corresponding to the diagnostic object having the strong association with diagnostic object X. The abnormality-related information storage area 22a preferentially stores the information about the diagnostic object having the strong association with diagnostic object X as the abnormality-related information about diagnostic object X.

The abnormality-related information storage area 22a includes the second area 23b and the third area 23c in the abnormality-specific storage area 23 for storing the abnormality-related information. As the abnormality-related information, the second area 23b and the third area 23c preferentially store the information about a diagnostic object likely to cause an abnormality on the diagnostic object indicated by the abnormality location information. The second area 23b and the third area 23c with limited requirements can be used efficiently.

(Third Embodiment)

The third embodiment differs from the ECU 11 according to the first embodiment in the following.

The ECU 11 is provided with an abnormality decision in progress list of identifiers capable of specifying the abnormality detection section 21 whose abnormality decision in progress flag is turned on.

The embodiment uses identification information about a diagnostic object corresponding to the abnormality detection section 21 as an identifier for the abnormality detection section 21. This is because the abnormality detection section 21 corresponds one-to-one with its diagnostic object. The abnormality decision in progress list may be stored in the storage device 22, rewritable nonvolatile memory independent of the storage device 22, the RAM in the microcomputer 12, or outside backup RAM, for example.

Figure 14:
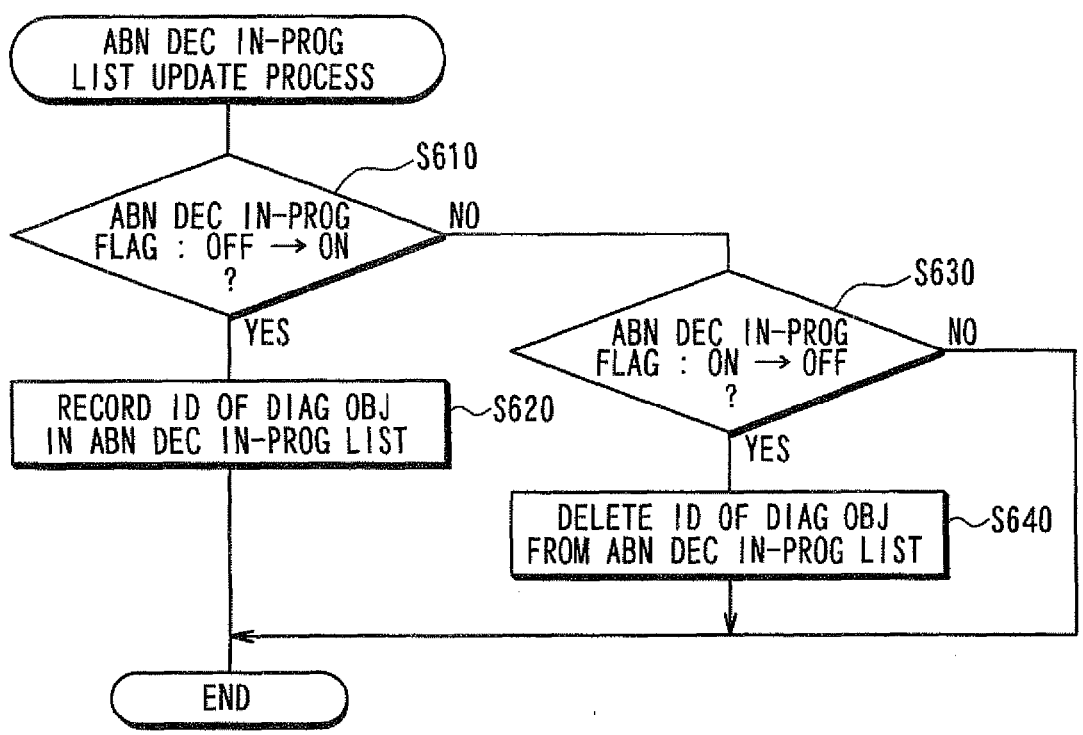
FIG. 14 is a flowchart illustrating an abnormality decision in progress list update process.

Each abnormality detection section 21 performs an abnormality decision in progress list update process in FIG. 14 after the abnormality detection process in FIG. 4.

At S610 in FIG. 14, the abnormality decision in progress list update process determines whether the immediately preceding abnormality detection process in FIG. 4 reverses the abnormality decision in progress flag for the abnormality detection section 21 from OFF to ON.

When the abnormality decision in progress flag is reversed from OFF to ON, the process proceeds to S620. The process records the identification information (also referred to as ID) about the corresponding diagnostic object in the abnormality decision in progress list and then terminates.

When it is determined at S610 that the abnormality decision in progress flag is not reversed from OFF to ON, the process proceeds to S630. The process determines whether the immediately preceding abnormality detection process in FIG. 4 reverses the abnormality decision in progress flag for the abnormality detection section 21 from ON to OFF.

When the abnormality decision in progress flag is not reversed from ON to OFF, the abnormality decision in progress list update process terminates. When the abnormality decision in progress flag is reversed from ON to OFF, the process proceeds to S640. The process deletes the identification information (ID) about the corresponding diagnostic object from the abnormality decision in progress list and then terminates.

Each abnormality detection section 21 performs the abnormality decision in progress list update process. As a result, the abnormality decision in progress list realtime records the identification information (ID) as an identifier for the diagnostic object corresponding to the abnormality detection section 21 whose abnormality decision in progress flag is turned on.

Figure 15:
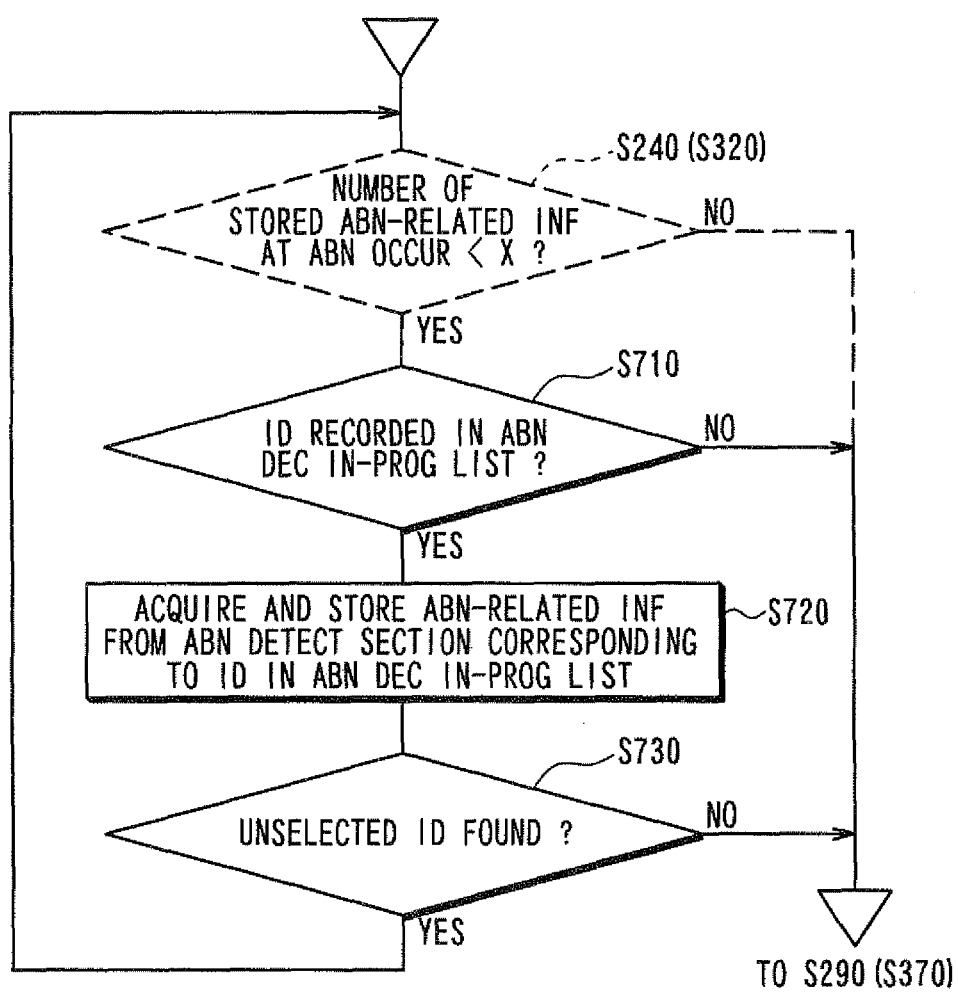
FIG. 15 is a flowchart illustrating a process that replaces some processes in FIGS. 5 and 6.

Each abnormality detection section 21 performs a process in FIG. 15 in place of S250 through S280 in FIG. 5.

As shown in FIG. 15, each abnormality detection section 21 may determine at S240 in FIG. 5 that the abnormality-related information storage count at abnormality occurrence is smaller than the upper bound. In this case, the process proceeds to S710 and determines whether an ID is recorded in the abnormality decision in progress list. When no ID is recorded, the process proceeds to S290 in FIG. 5.

When determining at S710 that an ID is recorded in the abnormality decision in progress list, the process proceeds to S720.

At S720, the process selects one of IDs that are recorded in the abnormality decision in progress list and are not selected yet after initiation of the process in FIG. 15. The process acquires information to be stored as the abnormality-related information (the identification information about the diagnostic object and the abnormality decision degree) at abnormality occurrence from the abnormality detection section 21 corresponding to the selected ID (more specifically, corresponding to the diagnostic object indicated by the selected ID) in the same procedure as S280 in FIG. 5. The process stores the acquired information as one piece of abnormality-related information at abnormality occurrence in the second area 23b of the abnormality-specific storage area 23 in the abnormality-related information storage area 22a containing the first area 23a where the identification information about the corresponding diagnostic object is stored. Instead of the information acquired from the abnormality detection section 21 corresponding to the selected ID, the selected ID itself may be stored as part of the abnormality-related information, i.e., the identification information about the diagnostic object.

At S730, the process determines whether there is an ID unselected at S720. When an unselected ID remains, the process returns to S240 in FIG. 5. When no IDs are unselected, the process proceeds to S290 in FIG. 5.

As seen from parenthesized steps in FIG. 15, each abnormality detection section 21 performs the process in FIG. 15 in place of S330 through S360 in FIG. 6.

Each abnormality detection section 21 may determine at S320 in FIG. 6 that the abnormality-related information storage count at abnormality confirmation is smaller than the upper bound. In this case, the process proceeds to S710 and determines whether an ID is recorded in the abnormality decision in progress list. When no ID is recorded, the process proceeds to S370 in FIG. 6.

When determining at S710 that an ID is recorded in the abnormality decision in progress list, the process proceeds to S720. At S720, the process selects one of IDs that are recorded in the abnormality decision in progress list and are not selected yet after initiation of the process in FIG. 15. The process acquires information to be stored as the abnormality-related information (the identification information about the diagnostic object and the abnormality decision degree) at abnormality confirmation from the abnormality detection section 21 corresponding to the selected ID. The process stores the acquired information as one piece of abnormality-related information at abnormality confirmation in the third area 23c of the abnormality-specific storage area 23 in the abnormality-related information storage area 22a containing the first area 23a where the identification information about the corresponding diagnostic object is stored. As mentioned above, the ID selected from the abnormality decision in progress list may be stored as part of the abnormality-related information, i.e., the identification information about the diagnostic object.

At S730, the process determines whether there is an ID unselected at 5720. When an unselected ID remains, the process returns to S320 in FIG. 6. When no IDs are unselected, the process proceeds to S370 in FIG. 6.

Each abnormality detection section 21 references the abnormality decision in progress list when specifying the other abnormality detection section 21 whose abnormality decision in progress flag is turned on. The ID recorded in the abnormality decision in progress list is used to specify the other abnormality detection section 21 whose abnormality decision in progress flag is turned on.

According to the third embodiment, each abnormality detection section 21 can specify other abnormality detection sections 21 having their abnormality decision in progress flags turned on just by referencing the abnormality decision in progress list in an attempt to store the abnormality-related information. There is no need for the process (S250 through S270 in FIG. 5 or S330 through S350 in FIG. 6) of checking the abnormality decision in progress flags one by one for the other abnormality detection sections 21. The processing load can be decreased. The embodiment is especially effective when many abnormality detection sections 21 are used. As described with reference to the apparatus according to claim 7, it is possible to easily ensure the synchronism of the abnormality-related information to be stored.

In the third embodiment, the process in FIG. 14 is equivalent to an abnormality decision in progress list updating unit.

The technique of the second embodiment is also applicable to the third embodiment.

The ECU 11 can be provided with the association table group as described in the second embodiment.

At S710 in FIG. 15, each abnormality detection section 21 references the association table for the corresponding diagnostic object to detect the associated diagnostic object for the corresponding diagnostic object. The abnormality detection section 21 checks only the ID of the associated diagnostic object whether it is recorded in the abnormality decision in progress list. At S720 in FIG. 15, the abnormality detection section 21 only selects the ID for the associated diagnostic object from the abnormality decision in progress list. When selecting the ID for the associated diagnostic object from the abnormality decision in progress list at S720, the abnormality detection section 21 may be configured to manage the order of degrees of association between the corresponding diagnostic object and the associated diagnostic objects based on the indexes contained in the association table. The abnormality detection section 21 may first select the ID for the associated diagnostic object most strongly associated with the corresponding diagnostic object.

(Fourth Embodiment)

The fourth embodiment applies the present invention to an onboard network (onboard communication system) including multiple ECUs that are mounted on a vehicle and communicate with each other.

Figure 16:
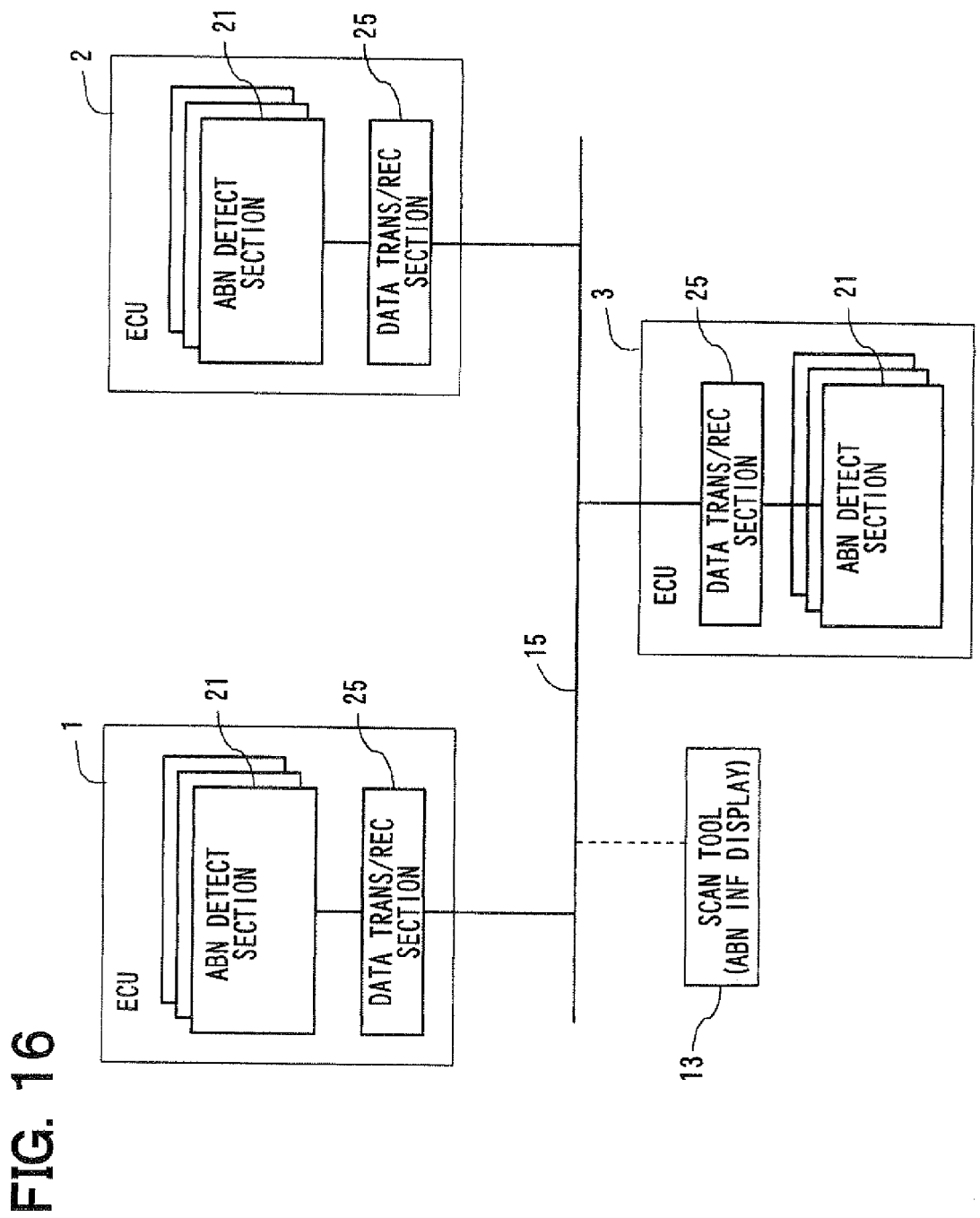
FIG. 16 is a diagram illustrating an onboard network according to a fourth embodiment.

As shown in FIG. 16, the onboard network according to the fourth embodiment includes multiple (three in this example) ECUs 1 through 3 connected to each other through a communication line 15 in an vehicle.

For example, the ECU 1 controls a vehicle engine. The ECU 2 controls a transmission system. The ECU 3 controls the others. The ECUs 1 through 3 communicate with each other to exchange various types of information such as control data. For this purpose, the ECUs 1 through 3 are each provided with a data transmitting and receiving section 25 (equivalent to a communication unit) for communication with the other devices via the communication line 15.

The ECUs 1 through 3 are provided with the same configuration and function as the ECU 11 according to the above-mentioned embodiments except control contents. The ECUs 1 through 3 are also provided with one or more abnormality detection sections 21 and the storage device 22 (not shown in FIG. 16). Though omitted in FIG. 1, the data transmitting and receiving section 25 is also provided for the ECU 11. Also in this embodiment, the scan tool 13 can be connected to the communication line 15.

Each abnormality detection section 21 in each of the ECUs 1 through 3 attempts to store the abnormality-related information at abnormality occurrence or abnormality confirmation (YES at S240 in FIG. 5 or YES at S320 in FIG. 6). In this case, the ECU including the relevant abnormality detection section 21 is referred to as a local ECU. The abnormality detection section 21 uses the same technique described in any of the above-mentioned embodiments to specify another abnormality detection section 21 that is included in the ECU other than the local ECU and has the abnormality decision in progress flag turned on. The abnormality detection section 21 acquires the information (the identification information about the diagnostic object and the abnormality decision degree) to be stored as the abnormality-related information from the specified abnormality detection section 21.

When storing the abnormality-related information at abnormality occurrence or abnormality confirmation, for example, each abnormality detection section 21 in each of the ECUs 1 through 3 uses the following procedure to specify another abnormality detection section 21 that is included in a remote ECU, i.e., an ECU other than the local ECU, and has the abnormality decision in progress flag turned on. The abnormality detection section 21 also acquires information to be stored as the abnormality-related information from the specified abnormality detection section 21.

For example, the abnormality detection section 21c communicates with a remote ECU using the data transmitting and receiving section 25 and the communication line 15. The abnormality detection section 21c transmits a request message to the remote ECU so as to request the abnormality decision in progress flag of the abnormality detection section 21 included in the remote ECU, the identification information about the diagnostic object, and the abnormality decision degree.

When receiving the request message, the remote ECU transmits the abnormality decision in progress flag for the abnormality detection section 21 included in itself, the identification information about the diagnostic object, and the abnormality decision degree to the ECU that transmitted the request message.

The abnormality detection section 21c that transmitted the request message checks on/off states of the abnormality decision in progress flags transmitted from the remote ECU. When there is an abnormality decision in progress flag that is turned on, the abnormality detection section 21c stores the identification information about the diagnostic object and the abnormality decision degree transmitted along with that abnormality decision in progress flag as the abnormality-related information.

According to this procedure, however, the abnormality detection sections 21 communicate with all the remote ECUs and acquire the abnormality decision in progress flags for all the abnormality detection sections 21 included in the remote ECUs and check on/off states of the flags. Such a procedure greatly increases a load on the process of acquiring information to be stored as the abnormality-related information. The amount of communication data tends to increase. A fifth embodiment solves this problem as will be described next.

(Fifth Embodiment)

FIG. 17 shows an onboard network according to the fifth embodiment. Compared with the fourth embodiment, the ECUs 1 through 3 according to the fifth embodiment are each provided with the same configuration and function as the ECU 11 according to the third embodiment. The ECUs 1 through 3 each includes an abnormality state storage section 27.

The abnormality state storage section 27 stores an abnormality decision in progress list 28 and an ECU list 29. The abnormality state storage section 27 uses rewritable nonvolatile memory or backup RAM, for example. The abnormality state storage section 27 may be configured as a partial storage area in the storage device 22.

The abnormality decision in progress list 28 is equivalent to that described in the third embodiment. The abnormality decision in progress list 28 records the ID of the diagnostic object corresponding to the abnormality detection section 21 having the abnormality decision in progress flag turned on in the local ECU where the abnormality decision in progress list 28 is provided.

The ECU list 29 is equivalent to a unit list and records ECUID of the remote ECU including the abnormality detection section 21 having the abnormality decision in progress flag turned on. The ECUID signifies an ECU identifier and is equivalent to a unit identifier.

Figure 18B:
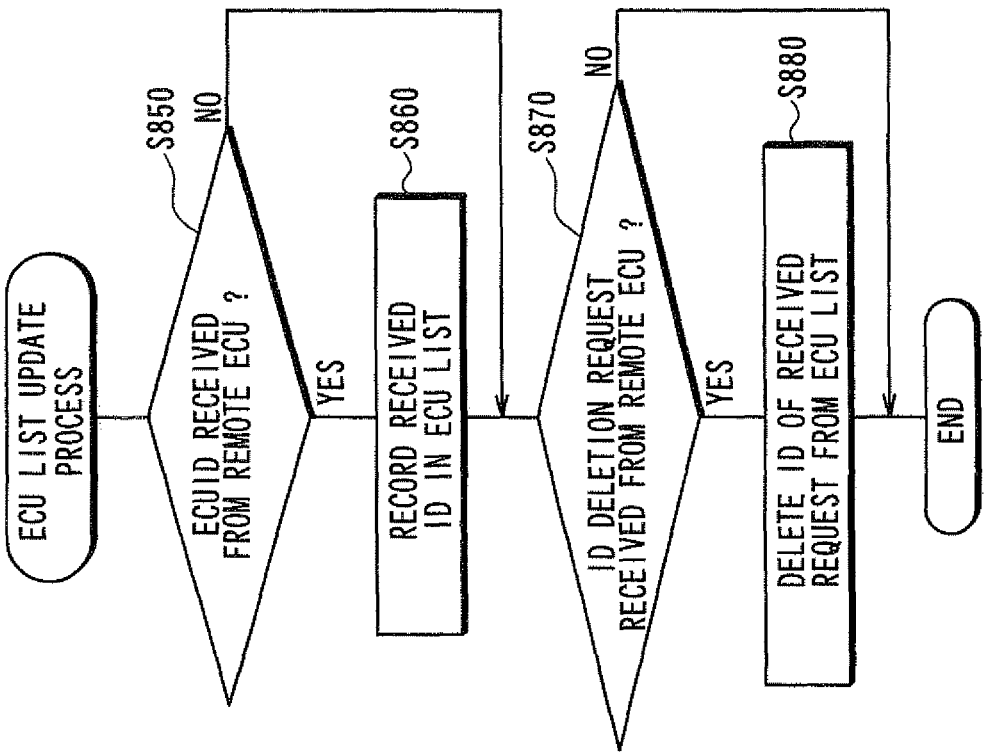
FIGS. 18A and 18B are flowcharts illustrating processes that update an ECU list in each ECU.
Figure 18A:
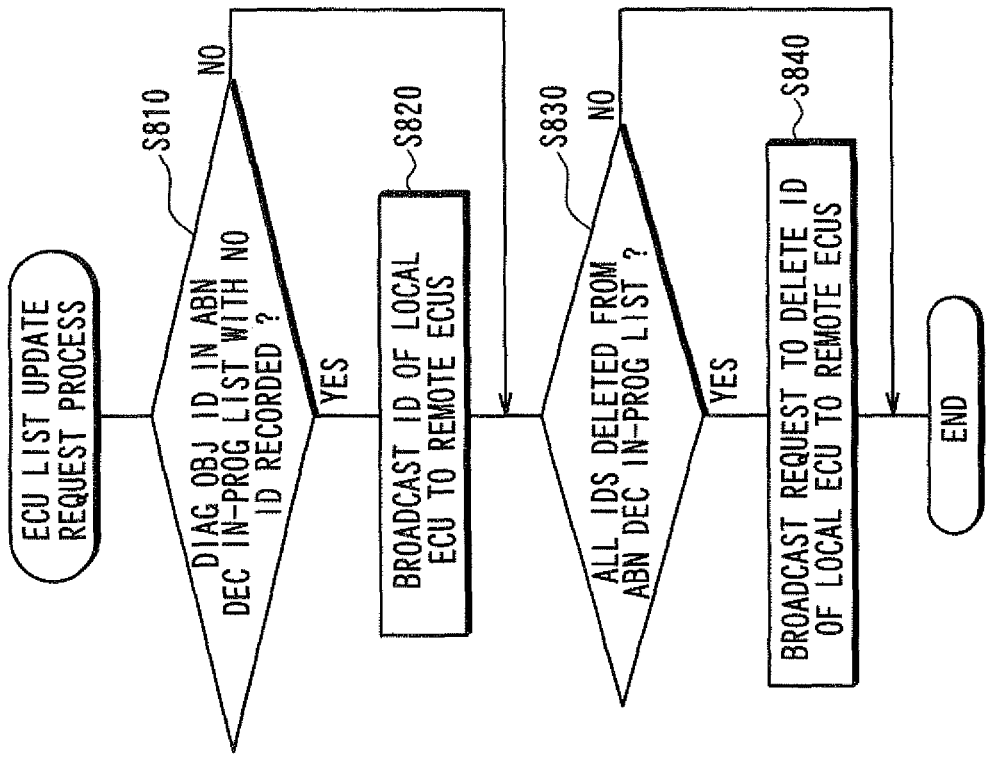

The CPU of the microcomputer 12 provided for each of the ECUs 1 through 3 periodically performs processes in FIGS. 18A and 18B.

FIG. 18A is a flowchart showing an ECU list update request process that requests the remote ECU to update the ECU list 29 in that ECU.

As shown in FIG. 18A, the CPU of the microcomputer 12 starts the ECU list update request process. At S810, the process determines whether a diagnostic object ID is recorded in the abnormality decision in progress list 28 with no ID recorded. The process at S620 in FIG. 14 records an ID in the abnormality decision in progress list 28.

When the determination at S810 yields an affirmative result (YES), the process proceeds to S820. The process transmits (broadcasts) the ECUID of the local ECU to all the remote ECUs and then proceeds to S830. The transmitted ECUID also contains information that requests recording in the ECU list 29 for the destination ECU. When the determination at S810 yields a negative result (NO), the process skips S820 and proceeds to S830.

When the abnormality decision in progress flags for all the abnormality detection sections 21 included in the local ECU are turned off, turning on at least one of the flags transmits the ECUID of the local ECU to the remote ECU. The communication between ECUs uses the data transmitting and receiving section 25 and the communication line 15 provided for each ECU.

At S830, the process determines whether all IDs are deleted from the abnormality decision in progress list 28 that records IDs.

When the determination at S830 yields an affirmative result, the process proceeds to S840. The process transmits (broadcasts) an ID deletion request to all the remote ECUs in order to delete the ECUID of the local ECU and then terminates. When the determination at S830 yields a negative result, the process skips S840 and then terminates.

When at least one of the abnormality detection sections 21 included in the local ECU turns on its abnormality decision in progress flag, turning off the flags for all the abnormality detection sections 21 in the local ECU transmits the ID deletion request to the remote ECU so as to delete the ECUID of the local ECU.

FIG. 18B is a flowchart showing an ECU list update process that updates the ECU list 29 in the local ECU.

As shown in FIG. 18B, the CPU of the microcomputer 12 starts the ECU list update process. At S850, the process determines whether an ECUID is received from the remote ECU. The targeted ECUID is to be transmitted from the remote ECU at S820 in FIG. 18A.

When no ECUID is received from the remote ECU, the process proceeds to S870. When an ECUID is received from the remote ECU, the process proceeds to S860. The process records the received ECUID in the ECU list 29 of the local ECU and then proceeds to S870.

At S870, the process determines whether an ID deletion request is received from the remote ECU. The targeted ID deletion request is to be transmitted from the remote ECU at S840 in FIG. 18A.

When no ID deletion request is received from the remote ECU, the ECU list update process terminates. When an ID deletion request is received from the remote ECU, the process proceeds to S880. The process deletes the ECUID indicated by the received ID deletion request from the ECU list 29 of the local ECU and then terminates.

While the ECUs 1 through 3 perform the processes in FIGS. 18A and 18B, the ECU list 29 in each of the ECUs 1 through 3 realtime records the ECUID of the remote ECU including the abnormality detection section 21 having the abnormality decision in progress flag turned on.

The process in FIG. 15 is performed to store the abnormality-related information at abnormality occurrence in place of S250 through S280 in FIG. 5. The determination may result in NO at S710 or S730 of the process in FIG. 15. In this case, the abnormality detection section 21 in each of the ECUs 1 through 3 performs the process in FIG. 19. Upon completion of the process in FIG. 19, the abnormality detection section 21 proceeds to S290 in FIG. 5.

Figure 19:
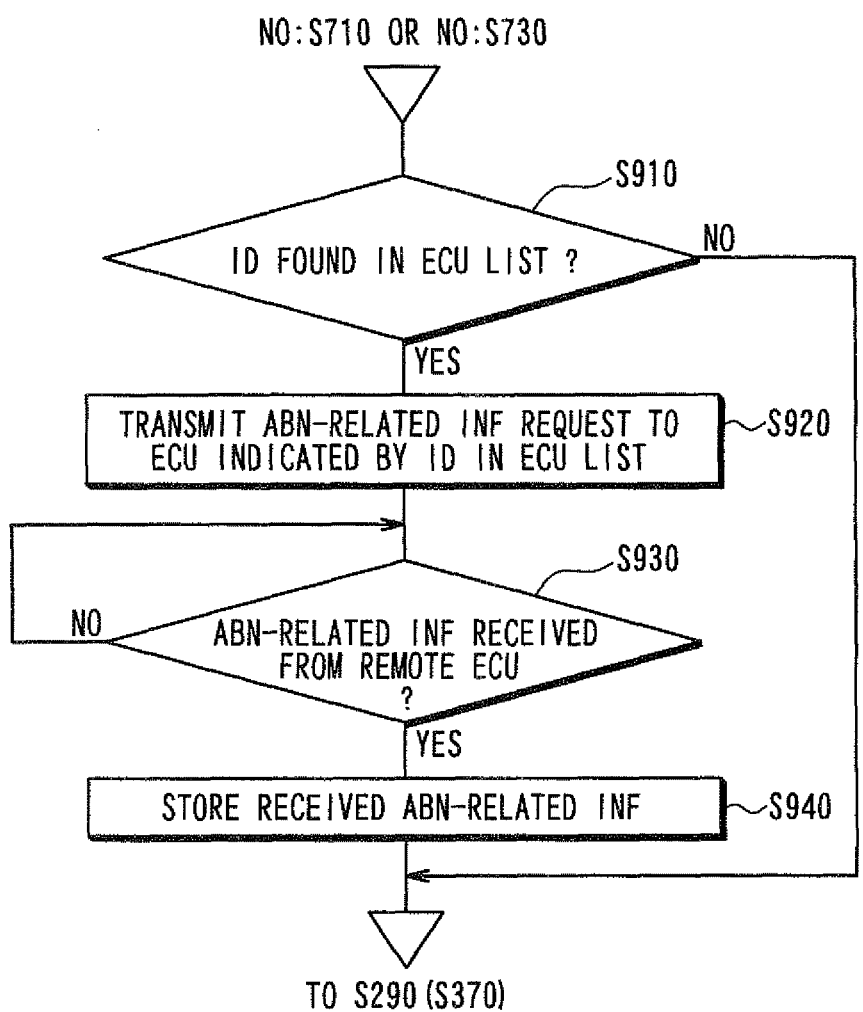
FIG. 19 is a flowchart illustrating a process that replaces the process in FIG. 15.

When the determination results in NO at S710 or S730 in FIG. 15, the process proceeds to S910 in FIG. 19 and determines whether an ECUID is recoded in the ECU list 29 for the local ECU.

When no ECUID is recorded, the process proceeds to S290 in FIG. 5. When an ECUID is recorded, the process proceeds to S920. The process transmits an abnormality-related information request to the remote ECU indicated by the recorded ECUID and then proceeds to S930.

As will be described later, each of the ECUs 1 through 3 performs the following when receiving the above-mentioned abnormality-related information request from the remote ECU. The ECU acquires information (the identification information about the diagnostic object for the abnormality detection section 21 and the abnormality decision degree) to be stored as the abnormality-related information from the abnormality detection section 21 having the abnormality decision in progress flag turned on in the local ECU. The ECU transmits the acquired information to the remote ECU that transmitted the abnormality-related information request.

At S930, the process waits until the abnormality-related information is transmitted from the remote ECU in response to the abnormality-related information request transmitted at S920. When receiving the abnormality-related information from the remote ECU, the process proceeds to S940. When no abnormality-related information is received within a limited time period, the process retransmits the abnormality-related information request or terminates the flow in FIG. 19 and proceeds to S290 in FIG. 5, for example.

At S940, the process stores the received abnormality-related information as the abnormality-related information at abnormality occurrence in the abnormality-related information storage area 22a, more specifically, in its second area 23b of the abnormality-specific storage area 23 whose first area 23a stores the identification information about the diagnostic object corresponding to the process.

When the ECU list records multiple ECUIDs, for example, the process at S290 to S940 is performed on each of the ECUIDs. The abnormality-related information storage count for abnormality occurrence may reach the upper bound during the storage process at S940 even though some remote ECU transmits no request for the abnormality-related information or the abnormality-related information is received from the remote ECU but is not stored yet. In such a case, the process terminates the flow in FIG. 19 and proceeds to S290 in FIG. 5.

Similarly, the process in FIG. 15 is performed to store the abnormality-related information at abnormality confirmation in place of S330 through S360 in FIG. 6. The determination may result in NO at S710 or S730 of the process in FIG. 15. Also in this case, the abnormality detection section 21 in each of the ECUs 1 through 3 performs the process in FIG. 19. Upon completion of the process in FIG. 19, the abnormality detection section 21 proceeds to S370 as parenthesized in FIG. 6. At S940 in FIG. 19, the process stores the abnormality-related information received from the remote ECU as the abnormality-related information at abnormality confirmation in the abnormality-related information storage area 22a, more specifically, in its third area 23c of the abnormality-specific storage area 23 whose first area 23a stores the identification information about the diagnostic object corresponding to the process.

Figure 20:
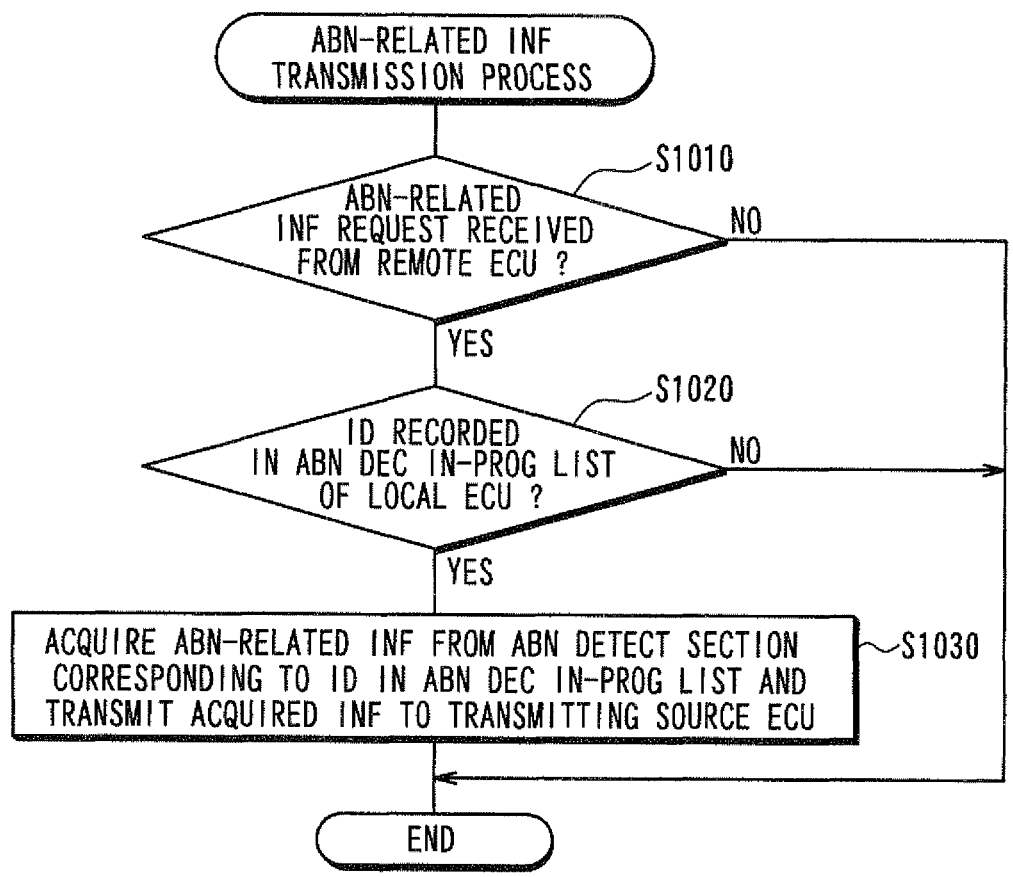
FIG. 20 is a flowchart illustrating an abnormality-related information transmission process.

The CPU of the microcomputer 12 provided for each of the ECUs 1 through 3 periodically performs an abnormality-related information transmission process in FIG. 20 in order to respond to the above-mentioned abnormality-related information request.

As shown in FIG. 20, the CPU of the microcomputer 12 starts the abnormality-related information transmission process. At S1010, the process determines whether an abnormality-related information request is received from the remote ECU. The targeted abnormality-related information request is to be transmitted from the remote ECU when any of the abnormality detection sections 21 in the remote ECU performs the process in FIG. 19 at S920.

When no abnormality-related information request is received from the remote ECU, the abnormality-related information transmission process terminates. When an abnormality-related information request is received, the process proceeds to S1020.

At S1020, the process determines whether the abnormality decision in progress list 28 for the local ECU records an ID, i.e., the identification information about the diagnostic object corresponding to the abnormality detection section 21 having the abnormality decision in progress flag turned on in the local ECU. When no ID is recorded, the abnormality-related information transmission process terminates. When the abnormality decision in progress list 28 records an ID, the process proceeds to S1030. When the abnormality-related information request is received from the remote ECU, the abnormality decision in progress list 28 for the local ECU should normally record at leas one ID. Therefore, the determination at S1020 is performed for confirmation.

At S1030, the process acquires information (the identification information about the diagnostic object and the abnormality decision degree) to be stored as the abnormality-related information from the abnormality detection section 21 corresponding to the ID recorded in the abnormality decision in progress list 28 in the same procedure as S280 in FIG. 5 or S720 in FIG. 15. The process transmits the acquired information to the transmitting ECU, i.e., the ECU transmitting the abnormality-related information request, and then terminates. The ID itself recorded in the abnormality decision in progress list 28 may be transmitted as the abnormality-related information in place of the identification information about the diagnostic object acquired from the abnormality detection section 21.

According to the fifth embodiment, each abnormality detection section 21 in each ECU can acquire information to be stored as the abnormality-related information from the remote ECU without using the procedure of acquiring abnormality decision in progress flags for all the abnormality detection sections 21 in all the remote ECUs from these ECUs by unit of communication and determining the on/off states of the flags. It is possible to shorten the time for each abnormality detection section 21 to store the abnormality-related information.

The communication is used to transmit the abnormality-related information request only to the remote ECU whose ECU list 29 records the ECUID. That ECU transmits only information to be stored as the abnormality-related information, i.e., information about the abnormality detection section 21 whose abnormality decision in progress flag is turned on. Accordingly, the amount of communication data can be reduced.

In addition, the ECUID is dynamically recorded or deleted from the ECU list 29. The design need not be changed even when the number of ECUs included in an onboard network varies or some ECUs are replaced with others.

According to this embodiment, the process at S810 and S820 in FIG. 18A is equivalent to a unit identification transmission unit. The process at S850 and S860 in FIG. 18B is equivalent to an identifier recording unit. The process at S830 and S840 in FIG. 18A is equivalent to a deletion request transmission unit. The process at S870 and S880 in FIG. 18B is equivalent to an identifier deletion unit. The process in FIG. 20 is equivalent to an abnormality-related information transmission unit.

While there have been described specific preferred embodiments of the present invention, it is to be distinctly understood that the present invention is not limited thereto but may be otherwise variously embodied within the spirit and scope of the invention.

For example, time information about the time to store the abnormality-related information may be also stored as the abnormality-related information in the abnormality-related information storage area 22*a*. The abnormality decision degree may not be stored as the abnormality-related information.

The process in FIG. 7 may be omitted. In this configuration, the abnormality-related information storage area 22*a* records the history of abnormality occurrence on a diagnostic object and the abnormality-related information even when an abnormality occurs on the diagnostic object, but no abnormality is confirmed, and the diagnostic object returns to a normal state and is confirmed to be normal. When an abnormality occurs at least once, the abnormality location information and the abnormality-related information are recorded even though no abnormality is confirmed. As a modification, the determination at S210 in FIG. 5 may be deleted. In such a configuration, the abnormality location information and the abnormality-related information about a given diagnostic object can be updated and stored each time an abnormality occurs for the first time after that diagnostic object is confirmed to be normal.

The abnormality confirmation condition determined at S125 in FIG. 4 may be a match between a cumulative, not a successive, count of the abnormality determination condition assumed to be satisfied and the abnormality confirming threshold value. Similarly, the normality confirmation condition determined at S150 in FIG. 4 may be a match between a cumulative count of the normality determination condition assumed to be satisfied and the normality confirming threshold value. It may be preferable to determine at unconfirmed intervals whether the abnormality determination condition and the normality determination condition are satisfied.

The abnormality detection section 21 may be configured as a hardware circuit.

The above disclosure has the following aspects.

According to an aspect of the present disclosure, a diagnostic information collection apparatus includes: a plurality of abnormality detection sections, each of which corresponds to a respective diagnostic object in a vehicle in order to detect an abnormality on the diagnostic object; and a memory. Each abnormality detection section includes: an abnormality occurrence determination unit that determines whether an abnormality occurs on a corresponding diagnostic object such that the abnormality occurrence determination unit checks whether the corresponding diagnostic object satisfies an abnormality determination condition; an abnormality confirming unit that confirms the corresponding diagnostic object to be abnormal when the number of abnormality determinations is equal to or larger than an abnormality confirmation threshold, the number of abnormality determinations being defined by frequency of determinations when the abnormality occurrence determination unit determines that the abnormality occurs on the corresponding diagnostic object; a normality conforming unit that determines whether the corresponding diagnostic object satisfies a normality determination condition and confirms the corresponding diagnostic object to be normal when the number of normality determinations is equal to or larger than an normality confirmation threshold, the number of normality determinations being defined by frequency of determinations when the normality confirming unit determines that the corresponding diagnostic object satisfies the normality determination condition; a state information generation unit that determines whether abnormality decision is in progress and generates state information indicative of a determination result whether abnormality decision is in progress, wherein the abnormality decision in progress denotes a state in which the abnormality occurrence determination unit determines the abnormality occurrence but both of the abnormality confirming unit and the normality confirming unit do not confirm whether the corresponding diagnostic object is normal or abnormal; and an abnormality-related information processing unit that controls the memory to store identification information about the corresponding diagnostic object as abnormality location information when the abnormality occurrence determination unit determine the abnormality occurrence on the corresponding diagnostic object at a first time, specifies another abnormality detection section having state information indicative of abnormality decision in progress, and controls the memory to store identification information about a respective diagnostic object of the specified another abnormality detection section as abnormality-related information in association with the abnormality location information.

The diagnostic information collection apparatus determines a first abnormality occurrence (first abnormality determination) on a given diagnostic object (X for example) and stores identification information IDx about diagnostic object X as the abnormality location information in the storage section. There may be another diagnostic object (Y for example) that is determined to be abnormal before the first abnormality determination and is not confirmed to be normal or abnormal yet. In this case, the memory stores identification information IDy about diagnostic object Y as the abnormality-related information about diagnostic object X in association with identification information IDx as the abnormality location information.

Such diagnostic information collection apparatus provides the following effects (a) through (c).

(a) The memory stores the abnormality-related information in association with the abnormality location information. Just reference to the abnormality-related information can identify another diagnostic object that is already determined to be abnormal at the first abnormality determination for the diagnostic object indicated by the abnormality location information. It is possible to assume that the other diagnostic object might have caused the abnormality of the diagnostic object indicated by the abnormality location information.

(b) The order of abnormality occurrences can be made clear without time information. This is because an abnormality on the diagnostic object indicated by the abnormality-related information stored in association with the abnormality location information is assumed to occur before an abnormality on a diagnostic object indicated by the abnormality location information.

(c) The abnormality-related information stored at the first abnormality determination is not updated. Let us consider a case where abnormality a occurs on diagnostic object A, then abnormality b occurs on diagnostic object B, and abnormality a becomes indefinite. Even in such a case, the abnormality-related information is stored in association with the abnormality location information indicative of diagnostic object B. It is made clear that abnormality a occurs on diagnostic object A before abnormality b occurs on diagnostic object B. It is possible to assume that abnormality a causes abnormality b.

The above-mentioned effects make it possible to correctly and easily understand the order of multiple abnormalities occurred on a vehicle and improve the ease of the diagnosis.

The abnormality confirming unit uses the abnormality determination count to determine whether the abnormality confirming threshold value is reached. For example, the abnormality determination count can be a successive count of abnormality occurrences determined by the abnormality occurrence determination unit. Alternatively, the abnormality determination count can be cumulative. That is, the count may be accumulated without resetting the determination count even when no abnormality is determined to occur and once discontinue the abnormality count. The abnormality occurrence determination unit may or may not periodically determine an abnormality occurrence. The same applies to the normality confirming unit. That is, the normality confirming unit may use a successive count or a cumulative count of cases determined to satisfy the normality determination condition in order to determine whether the normality confirming threshold value is reached. Whether the normality determination condition is satisfied may or may not be periodically determined.

Alternatively, the abnormality detection section may specify further another abnormality detection section having state information indicative of abnormality decision in progress when the abnormality confirming unit confirms the corresponding diagnostic object to be abnormal. The abnormality detection section controls the memory to store identification information about a respective diagnostic object of the specified further another abnormality detection section as the abnormality-related information in association with the abnormality location information. The abnormality-related information in association with the abnormality location information includes: the identification information about the respective diagnostic object of the specified another abnormality detection section when the abnormality occurrence determination unit determine the abnormality occurrence on the corresponding diagnostic object at a first time; and the identification information about the respective diagnostic object of the specified further another abnormality detection section when the abnormality confirming unit confirms the corresponding diagnostic object to be abnormal.

Even when a given diagnostic object (X for example) is confirmed to be abnormal (abnormality confirmation), there may be another diagnostic object (Y for example) that became abnormal prior to the abnormality confirmation and is not confirmed to be abnormal or normal yet. In such a case, the diagnostic information collection apparatus allows the memory to store identification information IDy about diagnostic object Y as the abnormality-related information (especially as the abnormality-related information at abnormality confirmation) on diagnostic object X in association with identification information IDx about diagnostic object X as the abnormality location information.

Such diagnostic information collection apparatus has the advantage of providing more detailed information (abnormality-related information at abnormality confirmation) for failure analysis. For example, the diagnostic information collection apparatus stores abnormality-related information about diagnostic object X at the first abnormality determination and abnormality-related information about the same at the abnormality confirmation. Both of the abnormality-related information indicate the same diagnostic object. In such a case, it is possible to assume that diagnostic object Y indicated by the abnormality-related information becomes abnormal prior to diagnostic object X but is not confirmed to be abnormal or normal at the abnormality confirmation of diagnostic object X.

Alternatively, the abnormality detection section may acquire an abnormality decision degree from the specified another abnormality detection section. The abnormality decision degree is indicative of a ratio between the number of abnormality determinations and the abnormality confirmation threshold in the specified another abnormality detection section. The abnormality detection section controls the memory to store the abnormality decision degree together with the identification information about the respective diagnostic object of the specified another abnormality detection section as the abnormality-related information.

For example, such diagnostic information collection apparatus can store identification information IDy about diagnostic object Y as the abnormality-related information about diagnostic object X. The abnormality determination degree is stored along with identification information IDy. Referencing the abnormality determination degree notifies the progress of the diagnosis on the other diagnostic object Y at the time point when the abnormality-related information about diagnostic object X was stored. In other words, the progress indicates to which degree diagnostic object Y approximates to the abnormality confirmation. The progress can notify the degree of possibility of confirming diagnostic object Y to be abnormal. This facilitates the determination whether an abnormality on diagnostic object Y caused an abnormality on diagnostic object X.

In the above apparatus, each abnormality detection section stores the abnormality determination degree at the first abnormality determination. In the above apparatus, each abnormality detection section stores the abnormality determination degree at the first abnormality determination and at the abnormality confirmation.

Alternatively, the memory may include an association information storing unit that stores association information indicative of a respective diagnostic object of further another abnormality detection section in association with the corresponding diagnostic object. The abnormality detection section references the association information and detects the respective diagnostic object of the further another abnormality detection section when the abnormality-related information processing unit specifies the another abnormality detection section having state information indicative of abnormality decision in progress. The abnormality-related information processing unit specifies the another abnormality detection section having state information indicative of abnormality decision in progress only from on the further another abnormality detection section.

A diagnostic object associated with diagnostic object X is referred to as an associated diagnostic object. The associated diagnostic object is so configured that an abnormality occurring on the associated diagnostic object may cause diagnostic object X to be also determined to be abnormal. The associated diagnostic object may cause diagnostic object X to be abnormal.

This configuration can reduce a processing load for specifying an abnormality detection section whose state information indicates the abnormality determination in progress.

The memory only stores information about the diagnostic object associated with diagnostic object X as the abnormality-related information about diagnostic object X. The capacity of the memory can be used efficiently.

Only information about a diagnostic object likely to be an abnormality cause is stored as the abnormality-related information. The abnormality cause can be analyzed efficiently.

Further, the association information may further include degree-of-association information indicative of a degree of association given to the respective diagnostic object of the further another abnormality detection section. The further another abnormality detection section includes a plurality of other abnormality detection sections. The abnormality detection section recognizes an order of the degree of association between respective diagnostic objects of the plurality of other abnormality detection sections based on the degree-of-association information. When the abnormality-related information processing unit specifies the another abnormality detection section having state information indicative of abnormality decision in progress only from the plurality of other abnormality detection sections, the abnormality-related information processing unit checks the plurality of other abnormality detection sections in descending order of the degree of association.

When storing the abnormality-related information about diagnostic object X, such apparatus determines whether the state information indicates the abnormality determination in progress preferentially with respect to an abnormality detection section corresponding to the diagnostic object having the strong association with diagnostic object X. The memory preferentially stores the information about the diagnostic object having the strong association with diagnostic object X as the abnormality-related information about diagnostic object X.

It is possible to efficiently use an area in the memory for storing the abnormality-related information when a limited number of pieces of abnormality-related information can be stored correspondingly to one piece of abnormality location information. This is because the memory preferentially stores the information about a diagnostic object likely to cause an abnormality as the abnormality-related information.

Alternatively, the abnormality detection section may control the memory to deletes information stored in the memory when the normality conforming unit confirms the corresponding diagnostic object to be normal before the abnormality confirming unit confirms the corresponding diagnostic object to be abnormal.

According to this configuration, the memory does not store past information about a diagnostic object confirmed to be normal. The memory can be used economically.

Alternatively, the memory may store an abnormality decision in progress list that records an identifier for specifying the another abnormality detection section having state information indicative of abnormality decision in progress. Each of the abnormality detection sections includes an abnormality decision in progress list updating unit. The abnormality decision in progress list updating unit controls the memory to record the identifier in the abnormality decision in progress list when the state information indicates the abnormality decision in progress. The abnormality decision in progress list updating unit controls the memory to delete the identifier from the abnormality decision in progress list when the state information indicates the abnormality decision not in progress. The abnormality-related information processing unit specifies the another abnormality detection section having state information indicative of abnormality decision in progress by referencing the identifier in the abnormality decision in progress list.

This configuration eliminates a process in which each abnormality detection section specifies another abnormality detection section having the state information indicative of the abnormality determination in progress by acquiring state information about the other abnormality detection section and determining whether the state information indicates the abnormality determination in progress. The configuration can reduce a processing load for specifying other abnormality detection sections whose state information indicates the abnormality determination in progress.

It is possible to easily ensure the synchronism of the abnormality-related information each abnormality detection section stores in the memory.

Let us consider the following example. The abnormality detection sections corresponding to diagnostic objects Y and Z respectively include state information STy and STz indicating the abnormality determination in progress. Under this condition, an abnormality occurrence is first determined on another diagnostic object X. Normally, identification information IDy about diagnostic object Y and identification information IDz about diagnostic object Z should be stored as the abnormality-related information about diagnostic object X. However, the abnormality detection section corresponding to diagnostic object X may consume long time to identify state information about other abnormality detection sections. Diagnostic object Z may be confirmed to be abnormal or normal and state information STz may not indicate the abnormality determination in progress before the abnormality detection section corresponding to diagnostic object X stores identification information IDy about diagnostic object Y as the abnormality-related information and then detects state information STz to be the abnormality determination in progress. In such a case, identification information IDz about diagnostic object Z is not stored as the abnormality-related information about diagnostic object X. The synchronism of the abnormality-related information is destroyed.

The configuration of the above apparatus can easily avoid this problem because each abnormality detection section can shorten the time to specify the other abnormality detection sections having the state information indicative of the abnormality determination in progress.

Alternatively, the abnormality detection section may control the memory to deletes information stored in the memory when the normality conforming unit confirms the corresponding diagnostic object to be normal before the abnormality confirming unit confirms the corresponding diagnostic object to be abnormal.

According to this configuration, the memory does not store past information about a diagnostic object confirmed to be normal. The memory can be used economically.

The diagnostic information collection apparatus according to the invention may be applied to a single electronic control unit or multiple electronic control units.

When the diagnostic information collection apparatus is applied to multiple electronic control units, each electronic control unit includes a communication unit for communication with the other electronic control units. Each abnormality detection section may explore abnormality detection sections provided for other electronic control units to determine whether the state information about the other abnormality detection sections indicates the abnormality determination in progress. The abnormality detection section may acquire information to be stored as the abnormality-related information from abnormality detection sections provided for the other electronic control units. In these cases, the communication unit can be used to exchange information between the electronic control units.

Alternatively, at least one of the plurality of abnormality detection sections may be arranged in each of a plurality of electronic control units that are mounted on the vehicle and communicate with each other. Each of the plurality of electronic control units includes: a communication unit that communicates with other electronic control units; a unit list memory that stores a unit list for recording a unit identifier indicative of another electronic control unit including an abnormality detection section having state information indicative of abnormality decision in progress; a unit identification transmission unit that transmits a unit identifier indicative of the electronic control unit to other electronic control units via the communication unit when a state that all of state information in all abnormality detection sections of the electronic control unit indicates the abnormality decision not in progress changes to a state that at least one of state information in one of the abnormality detection sections of the electronic control unit indicates the abnormality decision in progress; an identifier recording unit that records a unit identifier in the unit list when the communication unit receives the unit identifier transmitted from the unit identification transmission unit of the another electronic control unit; a deletion request transmission unit that transmits a deletion request for deleting a unit identifier indicative of the electronic control unit to other electronic control units via the communication unit when a state that at least one of state information in one of the abnormality detection sections of the electronic control unit indicates the abnormality decision in progress changes to a state that all of state information in all abnormality detection sections of the electronic control unit indicates the abnormality decision not in progress; an identifier deletion unit that deletes a unit identifier indicated in a deletion request from the unit list when the communication unit receives the deletion request transmitted from the deletion request transmission unit of another electronic control unit; and an abnormality-related information transmission unit. When the abnormality-related information processing unit specifies the another abnormality detection section having state information indicative of abnormality decision in progress, the abnormality detection section references the unit list in the electronic control unit, the communication unit transmits an abnormality-related information request for requesting information to be stored as the abnormality-related information in the memory to another electronic control unit indicated by a unit identifier included in the unit list, and the memory stores information received by the communication unit when the another electronic control unit transmits the information in response to the abnormality-related information request and the communication unit receives the information. When the communication unit receives an abnormality-related information request from another electronic control unit, the abnormality-related information processing unit specifies the another abnormality detection section having state information indicative of abnormality decision in progress, the abnormality-related information transmission unit acquires information to be related to the specified another abnormality detection section and to be stored as the abnormality-related information in the memory, and the communication unit transmits the acquired information to the another electronic control unit that transmits the abnormality-related information request.

Such configuration eliminates a procedure in which each abnormality detection section acquires the state information about an abnormality detection section in an electronic control unit other than the electronic control unit including that abnormality detection section itself and determines whether the state information indicates the abnormality determination in progress. Without such procedure, each abnormality detection section can acquire information about the other abnormality detection section to be stored as the abnormality-related information. It is possible to shorten the time for each abnormality detection section to store the abnormality-related information in the memory.

According to such configuration, the unit identifier is dynamically recorded or deleted from the unit list. The diagnostic information collection apparatus need not be redesigned even when the number of electronic control units varies or some electronic control units are replaced with others.

The memory may be provided for each of the electronic control units. Multiple electronic control units may share one memory. In the latter case, a storage device as the memory to be shared may be provided for a network connected to the electronic control units so as to be accessed from the electronic control units.

There may be some techniques of reading information stored in the memory as follows.

For example, one possible technique is to take a recording medium as the memory out of the electronic control unit provided with the diagnostic information collection apparatus and read information from the recording medium.

However, this technique requires a physical procedure of taking out the recording medium. Thus, the diagnostic information collection apparatus may further includes: a response unit that receives an output request for transmitting information stored in the memory from another apparatus, and outputs the information stored in the memory to the another apparatus.

According to this configuration, information recorded in the memory can be easily read. The information read from the memory can be displayed on a display screen of the other apparatus.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A diagnostic information collection apparatus comprising:
 a plurality of abnormality detection sections, each of which corresponds respectively to a diagnostic object in a vehicle in order to detect an abnormality on the diagnostic object; and
 a memory,
 wherein each abnormality detection section includes:
  an abnormality occurrence determination unit that determines whether an abnormality occurs on a corresponding diagnostic object such that the abnormality occurrence determination unit checks whether the corresponding diagnostic object satisfies an abnormality determination condition;
  an abnormality confirming unit that confirms the corresponding diagnostic object to be abnormal when the number of abnormality determinations is equal to or larger than an abnormality confirmation threshold, the number of abnormality determinations being defined by frequency of determinations when the abnormality occurrence determination unit determines that the abnormality occurs on the corresponding diagnostic object;

a normality conforming unit that determines whether the corresponding diagnostic object satisfies a normality determination condition and confirms the corresponding diagnostic object to be normal when the number of normality determinations is equal to or larger than a normality confirmation threshold, the number of normality determinations being defined by frequency of determinations when the normality confirming unit determines that the corresponding diagnostic object satisfies the normality determination condition;

a state information generation unit that determines whether an abnormality decision is in progress and generates state information indicative of a determination result whether the abnormality decision is in progress, wherein a determination that the abnormality decision is in progress denotes a state in which the abnormality occurrence determination unit determines the abnormality occurrence but both of the abnormality confirming unit and the normality confirming unit do not confirm whether the corresponding diagnostic object is normal or abnormal; and an abnormality-related information processing unit that controls the memory to store identification information about the corresponding diagnostic object as abnormality location information when the abnormality occurrence determination unit determine the abnormality occurrence on the corresponding diagnostic object at a first time, specifies another abnormality detection section having state information indicative of abnormality decision in progress, and controls the memory to store identification information about a respective diagnostic object of the specified another abnormality detection section as abnormality-related information in association with the abnormality location information.

2. The diagnostic information collection apparatus of claim 1,
wherein the abnormality detection section specifies further another abnormality detection section having state information indicative of abnormality decision in progress when the abnormality confirming unit confirms the corresponding diagnostic object to be abnormal,
wherein the abnormality detection section controls the memory to store identification information about a respective diagnostic object of the specified further another abnormality detection section as the abnormality-related information in association with the abnormality location information, and
wherein the abnormality-related information in association with the abnormality location information includes: the identification information about the respective diagnostic object of the specified another abnormality detection section when the abnormality occurrence determination unit determine the abnormality occurrence on the corresponding diagnostic object at a first time; and the identification information about the respective diagnostic object of the specified further another abnormality detection section when the abnormality confirming unit confirms the corresponding diagnostic object to be abnormal.

3. The diagnostic information collection apparatus according to claim 1,
wherein the abnormality detection section acquires an abnormality decision degree from the specified another abnormality detection section,
wherein the abnormality decision degree is indicative of a ratio between the number of abnormality determinations and the abnormality confirmation threshold in the specified another abnormality detection section, and
wherein the abnormality detection section controls the memory to store the abnormality decision degree together with the identification information about the respective diagnostic object of the specified another abnormality detection section as the abnormality-related information.

4. The diagnostic information collection apparatus according to claim 1,
wherein the memory includes an association information storing unit that stores association information indicative of a respective diagnostic object of further another abnormality detection section in association with the corresponding diagnostic object,
wherein the abnormality detection section references the association information and detects the respective diagnostic object of the further another abnormality detection section when the abnormality-related information processing unit specifies the another abnormality detection section having state information indicative of abnormality decision in progress, and
wherein the abnormality-related information processing unit specifies the another abnormality detection section having state information indicative of abnormality decision in progress only from on the further another abnormality detection section.

5. The diagnostic information collection apparatus according to claim 4,
wherein the association information further includes degree-of-association information indicative of a degree of association given to the respective diagnostic object of the further another abnormality detection section,
wherein the further another abnormality detection section includes a plurality of other abnormality detection sections,
wherein the abnormality detection section recognizes an order of the degree of association between respective diagnostic objects of the plurality of other abnormality detection sections based on the degree-of-association information, and
wherein, when the abnormality-related information processing unit specifies the another abnormality detection section having state information indicative of abnormality decision in progress only from the plurality of other abnormality detection sections, the abnormality-related information processing unit checks the plurality of other abnormality detection sections in descending order of the degree of association.

6. The diagnostic information collection apparatus according to claim 1,
wherein the abnormality detection section controls the memory to delete information stored in the memory when the normality conforming unit confirms the corresponding diagnostic object to be normal before the abnormality confirming unit confirms the corresponding diagnostic object to be abnormal.

7. The diagnostic information collection apparatus according to claim 1, wherein the memory stores an abnormality decision in progress list that records an identifier for specifying the another abnormality detection section having state information indicative of abnormality decision in progress, wherein each of the abnormality detection sections includes an abnormality decision in progress list updating unit, wherein the abnormality decision in progress list updating unit controls the memory to record the identifier in the abnormality decision in progress list when the state information indicates the abnormality decision in progress, wherein the abnormality decision in progress list updating unit controls the memory to delete the identifier from the abnormality decision in progress list when the state information indicates the abnormality decision not in progress, and wherein the abnormality-related information processing unit specifies the another abnormality detection section having state information indicative of abnormality decision in progress by referencing the identifier in the abnormality decision in progress list.

8. The diagnostic information collection apparatus according to claim 7, wherein the abnormality detection section controls the memory to delete information stored in the memory when the normality conforming unit confirms the corresponding diagnostic object to be normal before the abnormality confirming unit confirms the corresponding diagnostic object to be abnormal.

9. The diagnostic information collection apparatus according to claim 1, wherein at least one of the plurality of abnormality detection sections is arranged in each of a plurality of electronic control units that are mounted on the vehicle and communicate with each other, wherein each of the plurality of electronic control units includes:

a communication unit that communicates with other electronic control units;

a unit list memory that stores a unit list for recording a unit identifier indicative of another electronic control unit including an abnormality detection section having state information indicative of abnormality decision in progress;

a unit identification transmission unit that transmits a unit identifier indicative of the electronic control unit to other electronic control units via the communication unit when a state that all of state information in all abnormality detection sections of the electronic control unit indicates the abnormality decision not in progress changes to a state that at least one of state information in one of the abnormality detection sections of the electronic control unit indicates the abnormality decision in progress;

an identifier recording unit that records a unit identifier in the unit list when the communication unit receives the unit identifier transmitted from the unit identification transmission unit of the another electronic control unit;

a deletion request transmission unit that transmits a deletion request for deleting a unit identifier indicative of the electronic control unit to other electronic control units via the communication unit when a state that at least one of state information in one of the abnormality detection sections of the electronic control unit indicates the abnormality decision in progress changes to a state that all of state information in all abnormality detection sections of the electronic control unit indicates the abnormality decision not in progress;

an identifier deletion unit that deletes a unit identifier indicated in a deletion request from the unit list when the communication unit receives the deletion request transmitted from the deletion request transmission unit of another electronic control unit; and an abnormality-related information transmission unit, wherein, when the abnormality-related information processing unit specifies the another abnormality detection section having state information indicative of abnormality decision in progress, the abnormality detection section references the unit list in the electronic control unit, the communication unit transmits an abnormality-related information request for requesting information to be stored as the abnormality-related information in the memory to another electronic control unit indicated by a unit identifier included in the unit list, and the memory stores information received by the communication unit when the another electronic control unit transmits the information in response to the abnormality-related information request and the communication unit receives the information, and wherein, when the communication unit receives an abnormality-related information request from another electronic control unit, the abnormality-related information processing unit specifies the another abnormality detection section having state information indicative of abnormality decision in progress, the abnormality-related information transmission unit acquires information to be related to the specified another abnormality detection section and to be stored as the abnormality-related information in the memory, and the communication unit transmits the acquired information to the another electronic control unit that transmits the abnormality-related information request.

10. The diagnostic information collection apparatus according to claim 1 further comprising:

a response unit that receives an output request for transmitting information stored in the memory from another apparatus, and outputs the information stored in the memory to the another apparatus.

* * * * *

UNITED STATES PATENT AND TRADEMARK OFFICE
CERTIFICATE OF CORRECTION

PATENT NO. : 8,463,489 B2
APPLICATION NO. : 13/021087
DATED : June 11, 2013
INVENTOR(S) : Mao et al.

Page 1 of 1

It is certified that error appears in the above-identified patent and that said Letters Patent is hereby corrected as shown below:

Title Page, Item (75) should read:

(75) Inventors: Siyao Mao, Kariya (JP); Hirokazu Watanabe, Obu (JP); Masayoshi Kondoh, Chiryu (JP)

Signed and Sealed this
Thirtieth Day of July, 2013

Teresa Stanek Rea
*Acting Director of the United States Patent and Trademark Office*